United States Patent
Hinatsu et al.

(10) Patent No.: US 8,308,917 B2
(45) Date of Patent: Nov. 13, 2012

(54) ELECTROLYSER MODULE

(75) Inventors: Jim Hinatsu, Mississauga (CA); Michael Stemp, Toronto (CA)

(73) Assignee: Next Hydrogen Corporation (CA)

( * ) Notice: Subject to any disclaimer, the term of this patent is extended or adjusted under 35 U.S.C. 154(b) by 677 days.

(21) Appl. No.: 12/501,790

(22) Filed: Jul. 13, 2009

(65) Prior Publication Data

US 2010/0012503 A1 Jan. 21, 2010

(30) Foreign Application Priority Data

Jul. 15, 2008 (CA) ..................... 2637865

(51) Int. Cl.
*C25B 9/08* (2006.01)
(52) U.S. Cl. ........................ 204/256; 205/628
(58) Field of Classification Search .................. 204/256; 205/628

See application file for complete search history.

(56) References Cited

U.S. PATENT DOCUMENTS

| | | | | |
|---|---|---|---|---|
| 2,683,116 A | * | 7/1954 | Zdansky | ........................ 205/347 |
| 4,204,939 A | | 5/1980 | Boulton et al. | |
| 2007/0215492 A1 | | 9/2007 | Vandenborre | |

FOREIGN PATENT DOCUMENTS

| | | |
|---|---|---|
| JP | 57094579 A | 6/1982 |
| WO | WO-9528510 A1 | 10/1995 |
| WO | WO-9832900 A1 | 7/1998 |
| WO | WO-2006060912 A1 | 6/2006 |

OTHER PUBLICATIONS

F. Vitse, M. Cooper and G. G. Botte, *On the use of ammonia electrolysis for hydrogen production*, J. Power Sources 142, (2005) 18.
Notification Concerning Transmittal of International Preliminary Report on Patentability for PCT/CA2009/000960 (Jan. 27, 2011).
Office Action received in related Chinese patent application and English translation (Feb. 22, 2012).

* cited by examiner

*Primary Examiner* — Nicholas A. Smith
(74) *Attorney, Agent, or Firm* — Harness, Dickey & Pierce, P.L.C.

(57) ABSTRACT

An electrolyser module comprising a plurality of structural plates each having a sidewall extending between opposite end faces with a half cell chamber opening and at least two degassing chamber openings extending through the structural plate between the opposite end faces.

93 Claims, 14 Drawing Sheets

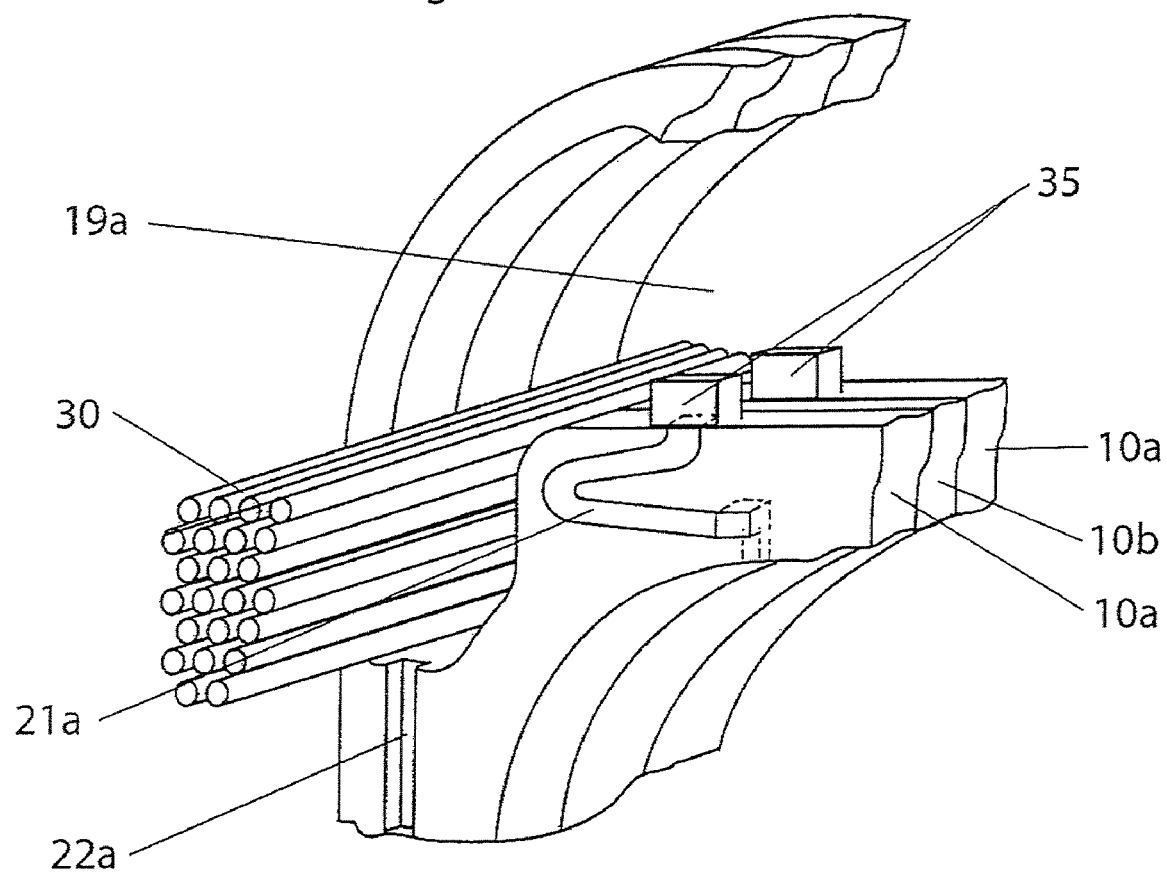

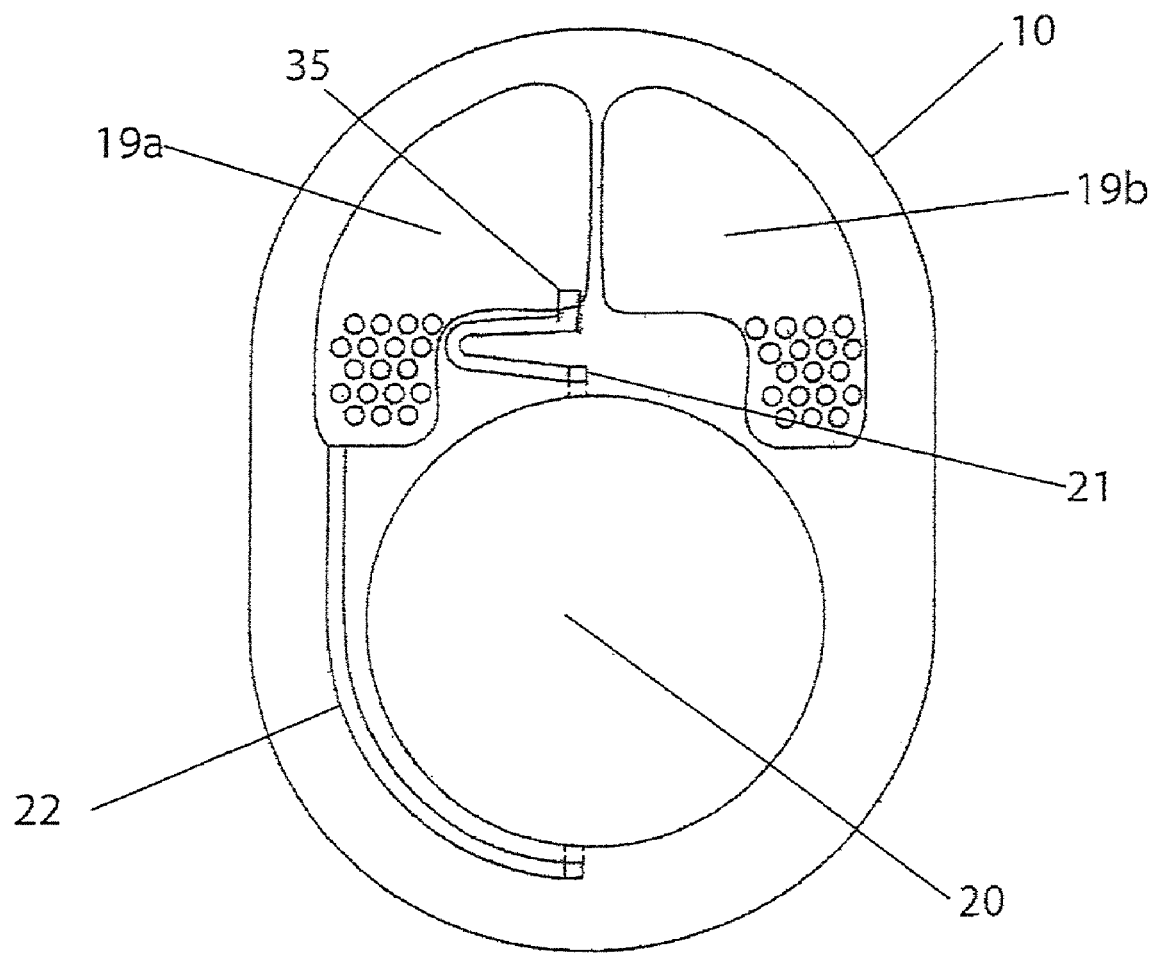

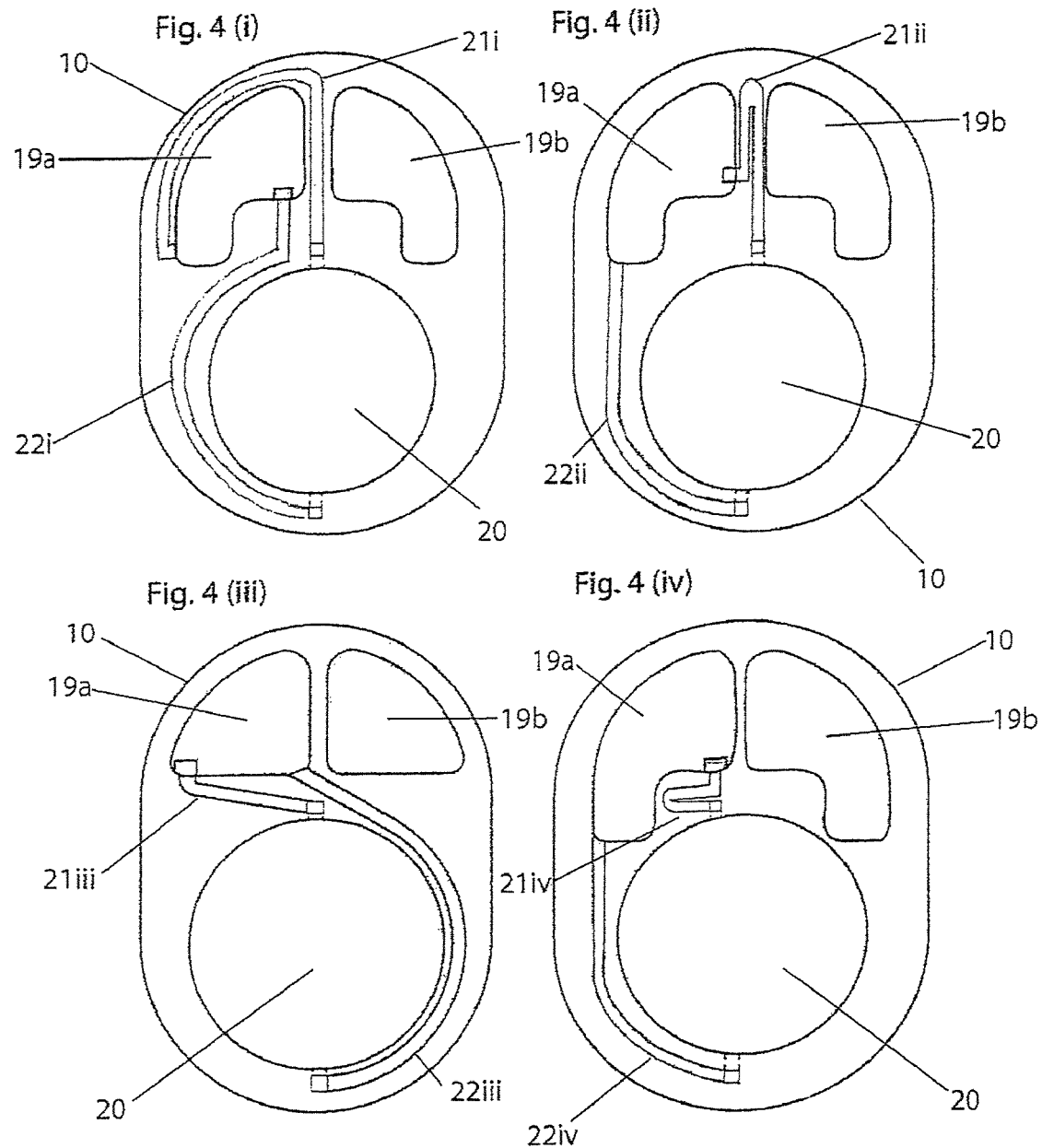

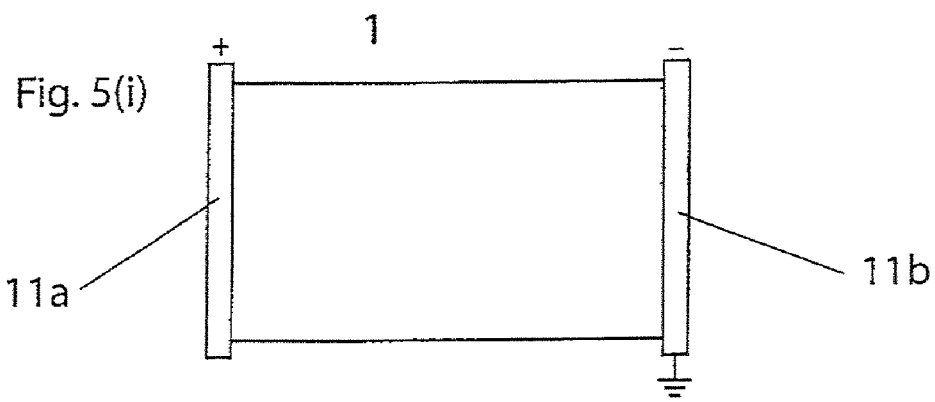
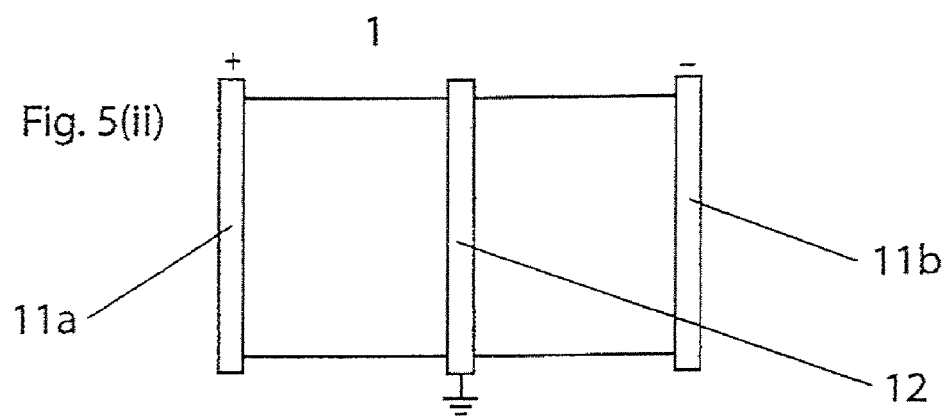
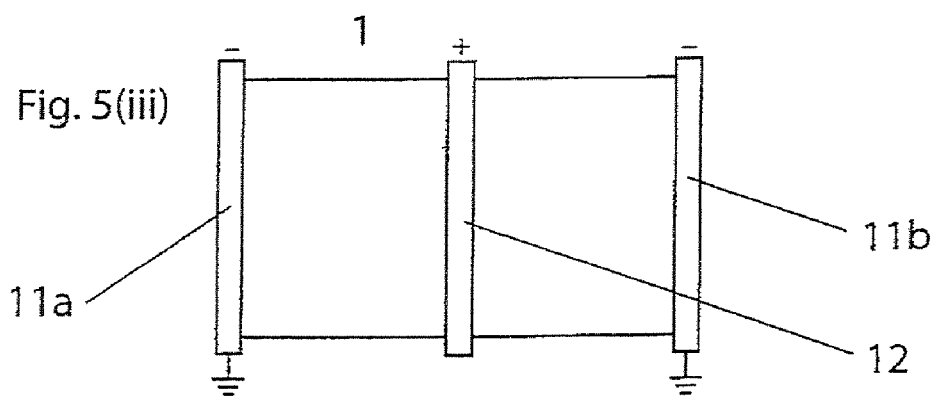
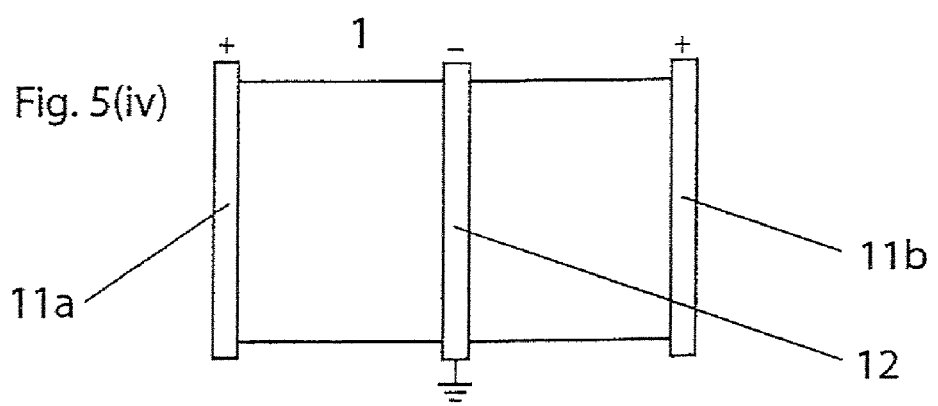

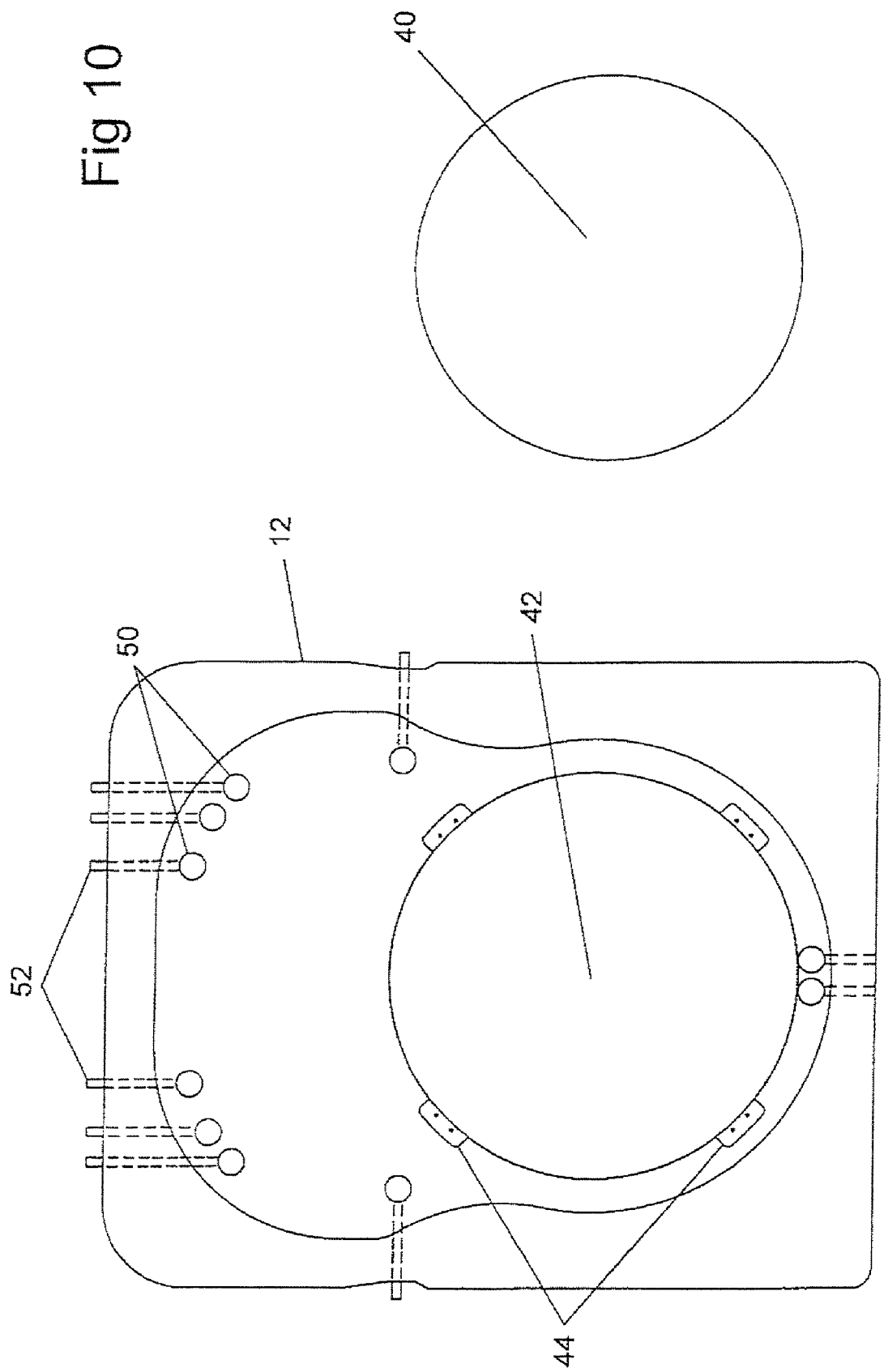

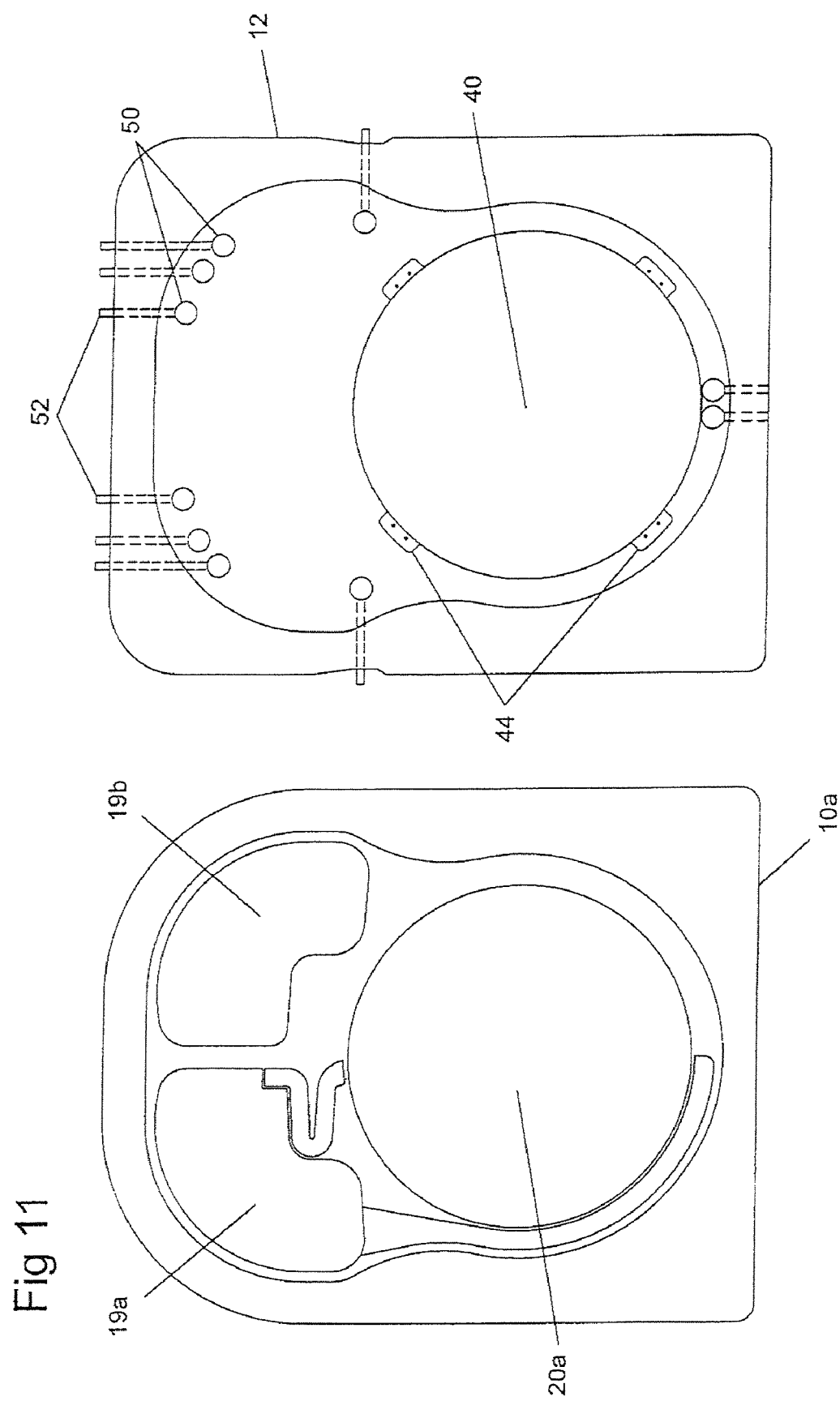

ELECTROLYSER MODULE

FIELD OF THE INVENTION

The present invention relates to the design of electrolysers for the production of gases such as hydrogen and oxygen, or hydrogen and nitrogen, or hydrogen and chlorine, and more particularly, to a water electrolyser module and components therefor.

BACKGROUND OF THE INVENTION

Electrolysers use electricity to transform reactant chemicals to desired product chemicals through electrochemical reactions, i.e., reactions that occur at electrodes that are in contact with an electrolyte. Hydrogen is a product chemical of increasing demand for use in chemical processes, and also potentially for use in hydrogen vehicles powered by hydrogen fuel cell engines or hydrogen internal combustion engines (or hybrid hydrogen vehicles, also partially powered by batteries). Electrolysers that can produce hydrogen include: water electrolysers, which produce hydrogen and oxygen from water and electricity; ammonia electrolysers, which produce hydrogen and nitrogen from ammonia and electricity; and, chlor-alkali electrolysers, which produce hydrogen, chlorine and caustic solution from brine and electricity.

Water electrolysers are the most common type of electrolyser used to produce gaseous hydrogen. The most common type of commercial water electrolyser currently is the alkaline water electrolyser. Alkaline water electrolysers utilize an alkaline electrolyte (typically an aqueous solution of, e.g., 25% to 35% KOH) in contact with appropriately catalyzed electrodes. Hydrogen is produced at the surfaces of the cathodes (negative electrodes), and oxygen is produced at the surfaces of the anodes (positive electrodes) upon passage of current between the electrodes. The rates of production of hydrogen and oxygen are proportional to the current flow in the absence of parasitic reactions and stray currents and for a given physical size of electrolyser. The electrolyte solute (potassium hydroxide) is not consumed in the reaction, but its concentration in the electrolyte may vary over a range with time, as a result of discontinuous replenishment of water reacted and also lost as water vapour with the product gases.

As used herein, the terms "half cell", "half electrolysis cell" and equivalent variations thereof refer to a structure comprising one electrode and its corresponding half cell chamber that provides space for gas-liquid (electrolyte) flow out of the half cell. The term "cathode half cell" refers to a half cell containing a cathode, and the term "anode half cell" refers to a half cell containing an anode.

As used herein, the terms "cell", "electrolysis cell" and equivalent variations thereof refer to a structure comprising a cathode half cell and an anode half cell. A cell also includes a separator membrane (referred to herein after as a "membrane"), typically located between, and in close proximity to or in contact with, the cathodes and anodes. The functionality of the membrane is to maintain the hydrogen and oxygen gases produced separate and of high purity, while allowing for ionic conduction of electricity between the anode and cathode. A membrane therefore defines one side of each half cell. The other side of each half cell is defined by an electronically conducting solid plate, typically comprised of metal, and generally known as a bipolar plate. The functionality of the bipolar plate is to maintain the fluids in adjacent half cell chambers of adjacent cells separate, while conducting current electronically between adjacent cells. Each half cell chamber also contains an electronically conducting component generally known as a current collector or current carrier, to conduct current across the half cell chamber, between the electrode and the bipolar plate.

Practical (commercial) alkaline water electrolysers utilize a structure comprising multiple cells, generally referred to as a "cell stack", in which the cells typically are electrically connected in series (although designs using cells connected in parallel and/or series also are known). A cell stack typically consists of multiple cells, with bipolar plates physically separating but electrically connecting adjacent cells. As used herein, the term "structural plate" refers to a body which defines at least one half cell chamber opening and at least two degassing chamber openings. A cell stack typically is constructed using a series of structural plates to define degassing chambers, and alternately cathode and anode half cell chambers for fluid (gas-liquid mixtures and liquid) flow. The structural plates also hold functional components, which may include, for example, cathodes, anodes, separator membranes, current collectors, and bipolar plates, in their appropriate spatial positions and arrangement. The series of structural plates and functional components typically constitutes a filter press type structure, including end (and in some cases, intermediate) pressure plates. The gases generated at the electrodes form gas-liquid mixtures with electrolyte in the half cell chambers, which typically are collected at the exits of the half cell chambers. The gas-liquid mixtures must be treated in degassing chambers, which serve to separate the respective gases from the entrained electrolyte. The terms "electrolyser module" or "electrolyser" refer to a structure comprised of an electrolyser cell stack and its associated degassing chambers.

Most practical water electrolyser modules today utilize large steel vessels located above the cell stack as degassing chambers (also commonly known as gas-liquid separators). There are two general design approaches for circulating fluids in an electrolyser module (i.e., for circulating gas-liquid mixtures from the cell stack to the degassing chambers, and then returning degassed liquid from the degassing chambers to the cell stack).

In the first general design approach, gas-liquid mixtures from each cathode half cell are collected in a manifold above the half cell chambers in the top part of the cell stack, which is connected to the corresponding (hydrogen) degassing chamber via a pipe or tube external to the cell stack; a similar arrangement is used for the anode half cells and the corresponding (oxygen) degassing chamber. The separated liquid is returned from the degassing chambers via piping or tubing that is external to the cell stack to a manifold or manifolds located in the cell stack, beneath the half cell chambers, from which liquid electrolyte is fed back into the individual cathode half cell chambers. There are two main corresponding practical (commercial) sub-approaches.

In the first sub-approach, exemplified in U.S. Pat. No. 4,758,322, the separated liquid in the degassing chambers is mechanically pumped back into the cell stack. While mechanical pumping overcomes the pressure drops in the horizontal manifolds in the cell stack and the external piping or tubing, and allows for large numbers of cells in a single stack (e.g., 200 or more cells), there are several associated disadvantages. For example, the use of a pump adds complexity, capital and operating cost, maintenance requirements, and may adversely affect the availability of the electrolyser module. The pump generally is operated at all times during module operation at a liquid flow rate corresponding to that required for the maximum nominal gas production rate, resulting in maximum associated power losses. Although a dual mechanical pump electrolyser module configuration also is disclosed, typically in practical (commercial) electrolyser modules, a single mechanical pump circuit is used to circulate liquid collected from both degassing chambers back to both the cathode half cell chambers and anode half cell chambers; this maintains equal pressures on either side of the membrane in each cell, but typically adversely affects gas purities by introducing the other gas (entrained in the returning liquid) into both the anode and cathode half cell chambers.

In the second sub-approach, exemplified in U.S. Pat. No. 6,554,978, the anode and cathode fluids are kept separate by relying on gas lift [buoyancy] and gravity head to circulate the fluids in separate circuits without pumps. Advantages of this design approach are the potential to maintain high gas purities and inherently self-regulating fluid flows; however, the number of cells per cell stack is limited by the pressure drop across the horizontal manifolds in the cell stack and the external piping or tubing, and the available vertical space to provide pressure head. Note that the sizes of the manifolds and the conduits connecting the manifolds to the individual half cells are limited by the requirement to restrict stray currents. Consequently, this particular approach generally has been limited to relatively small production capacities, with an associated requirement to use multiple cell stacks or multiple complete electrolyser modules to reach higher production capacities.

In the second general design approach, gas-liquid mixtures from each half cell chamber are fed to the corresponding degassing chamber via gas-liquid feed conduits for each individual half cell chamber. The separated liquid is returned from the degassing chamber via external piping or tubing to a manifold located beneath the half cell chambers, which feeds liquid electrolyte back into the individual half cell chambers. This approach, while somewhat more scaleable in terms of the number of cells in a single cell stack, requires a significant amount of piping and assembly, with many mechanical connection points, each representing a potential leak point. Furthermore, scalability remains limited by pressure drops across the common degassed liquid return path, i.e., the external piping or tubing and manifold beneath the half cell chambers in the bottom portion of the cell stack. Electrolyser modules using the second general design approach typically utilize mechanical pumps to circulate the fluids.

In all of the above approaches, the physical size of the electrolyser module, i.e., its lack of compactness for any given hydrogen gas production capacity, is problematic. In an attempt to obtain a more compact electrolyser module, developmental designs that incorporate the degassing chambers into the same structure as the cell stack also have been disclosed. However, none of these designs addresses the other drawbacks described above.

For example, WO 2006/060912 describes a design that incorporates the degassing chambers into the same structure as the cell stack, which also has manifolds above the half cell chambers to collect gas-liquid mixtures from the individual half cell chambers, and bottom manifolds to distribute degassed liquid from the degassing chamber back to the individual half cell chambers. U.S. Pat. No. 2,075,688 and US 20070215492 also describe designs that incorporate the degassing chambers into the same structure as the cell stack, and also teach the use of manifolds beneath the half cell chambers to distribute degassed liquid to the individual half cell chambers. While the anode and cathode half cells are maintained completely separate in these designs, the number of cells per stack is limited by the pressure drop across the horizontal manifolds, and the limited head available in the relatively compact module design.

In order to address the shortcomings of known practical electrolyser modules, what is needed is an inherently scaleable design approach, that provides freedom to vary the number of cells over a wide range to meet a wide range of gas production capacity, including very high gas production capacity, while at the same time minimizing associated mechanical connections and assembly, eliminating requirements for mechanical pumping of electrolyte, and maximizing product gas purities. Such a design, especially when further designed to provide a wide range of gas production capacity per cell, would be especially useful when connected to a source of electricity with variable output power, for example, a wind farm or a solar array.

SUMMARY OF THE INVENTION

An electrolyser module comprising a plurality of structural plates each having a sidewall extending between opposite end faces with a half cell chamber opening and at least two degassing chamber openings extending through the structural plate between the opposite end faces. The structural plates are arranged in face to face juxtaposition between opposite end plates. Each half cell chamber opening at least partially houses electrolytic half cell components comprising at least an electrode, a bipolar plate in electrical communication with the electrode and a membrane. The structural plates and half cell components define an array of series connected electrolytic cells surmounted by at least first and second degassing chambers having an upper section above a lower section. The structural plates define, at least when in face to face juxtaposition, respective gas-liquid passages extending between a top part of the half cell chambers and a bottom part of the upper section of the first and second degassing chambers to provide fluid communication between an anode part of the electrolytic cells and the first degassing chamber and between a cathode part of said electrolytic cells and said second degassing chamber. The structural plates further define, at least when in face to face juxtaposition, respective degassed liquid passages extending between a bottom part of the lower section of the first and second degassing chambers and a bottom part of the half cell chambers for degassed liquid return from the first and second degassing chambers respectively to the anode and cathode parts of the electrolytic cells. The electrolyser module further comprises respective gas discharge and feed water passages extending therethrough and fluidly communicating with the degassing chambers for gas discharge from the degassing chambers and for feed water introduction into the degassing chambers.

A method of producing hydrogen gas and oxygen gas using an electrolyser module comprising the steps of:
(a) generating hydrogen gas and oxygen gas by alkaline electrolysis of water in a plurality of electrolytic cells contained in the electrolyser module each said electrolytic cell comprising a cathode half cell wherein said hydrogen gas is generated and an anode half cell wherein said oxygen gas is generated;
(b) transferring a mixture of the hydrogen gas and liquid electrolyte directly from a top part of each cathode half cell chamber to a bottom part of an upper section of at least one hydrogen degassing chamber integrally contained in the electrolyser module structure through respective gas-liquid transfer passages extending directly from each cathode half cell chamber to the at least one hydrogen degassing chamber;
(c) separating the hydrogen gas from the liquid electrolyte in the at least one hydrogen degassing chamber to produce hydrogen gas and degassed electrolyte;
(d) removing the hydrogen gas from the top part of the at least one hydrogen degassing chamber;

(e) transferring the degassed electrolyte directly from a bottom part of a lower section of the at least one hydrogen degassing chamber to a bottom part of each cathode half cell chamber through respective degassed liquid passages extending directly from the at least one hydrogen degassing chamber to each cathode half cell chamber;

(f) transferring a mixture of the oxygen gas and liquid electrolyte directly from a top part of each anode half cell chamber to a bottom part of an upper section of at least one oxygen degassing chamber contained in the electrolyser module structure through respective gas-liquid transfer passages extending directly from each anode half cell chamber to the at least one oxygen degassing chamber;

(g) separating the oxygen gas from the liquid electrolyte in the at least one oxygen degassing chamber to produce oxygen gas and degassed electrolyte;

(h) removing the oxygen gas from the top part of the at least one oxygen degassing chamber;

(i) transferring the degassed electrolyte directly from a bottom part of a lower section of the at least one oxygen degassing chamber to a bottom part of each anode half cell chamber through respective degassed liquid passages extending directly from the at least one oxygen degassing chamber to each anode degassing chamber.

DESCRIPTION OF DRAWINGS

Preferred embodiments of the present invention are described below with reference to the accompanying illustrations in which:

FIG. 2 shows further detail of the degassing chamber part of an electrolyser module in accordance with the present invention;

FIG. 3 shows the front face of an embodiment of a structural plate in accordance with the present invention;

FIGS. 4(i) to 4(iv) show examples of structural plates for an electrolyser module with different passage configurations in accordance with the present invention;

FIG. 10 is a front view of an alternate embodiment of an intermediate pressure plate according to the present invention; and;

FIG. 11 is a view corresponding to FIG. 10 but showing its relationship to a first structural plate.

DESCRIPTION OF PREFERRED EMBODIMENTS

Figure 1A:
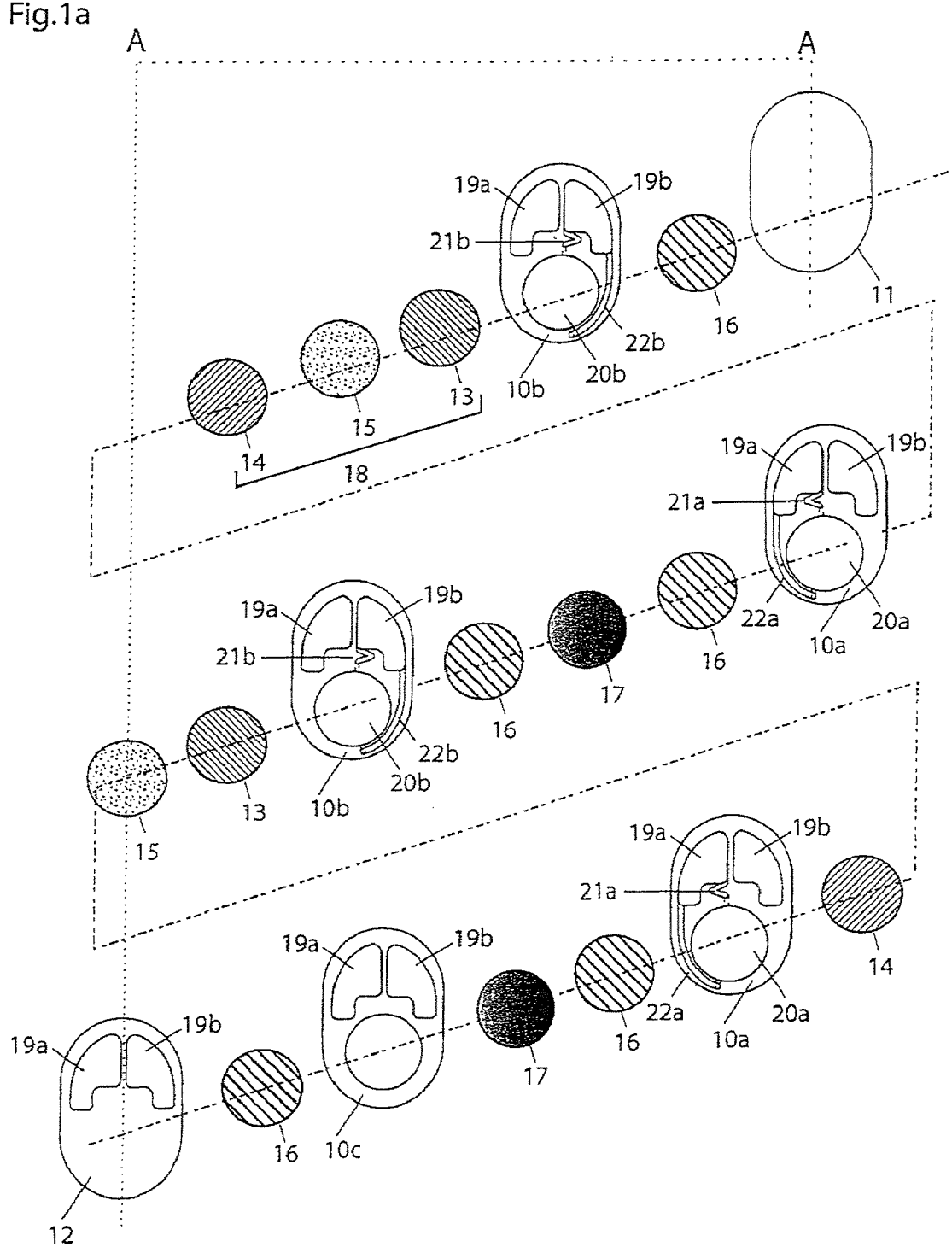
FIG. 1a is an assembly view of about half of an electrolyser module in accordance with the present invention.
Figure 1B:
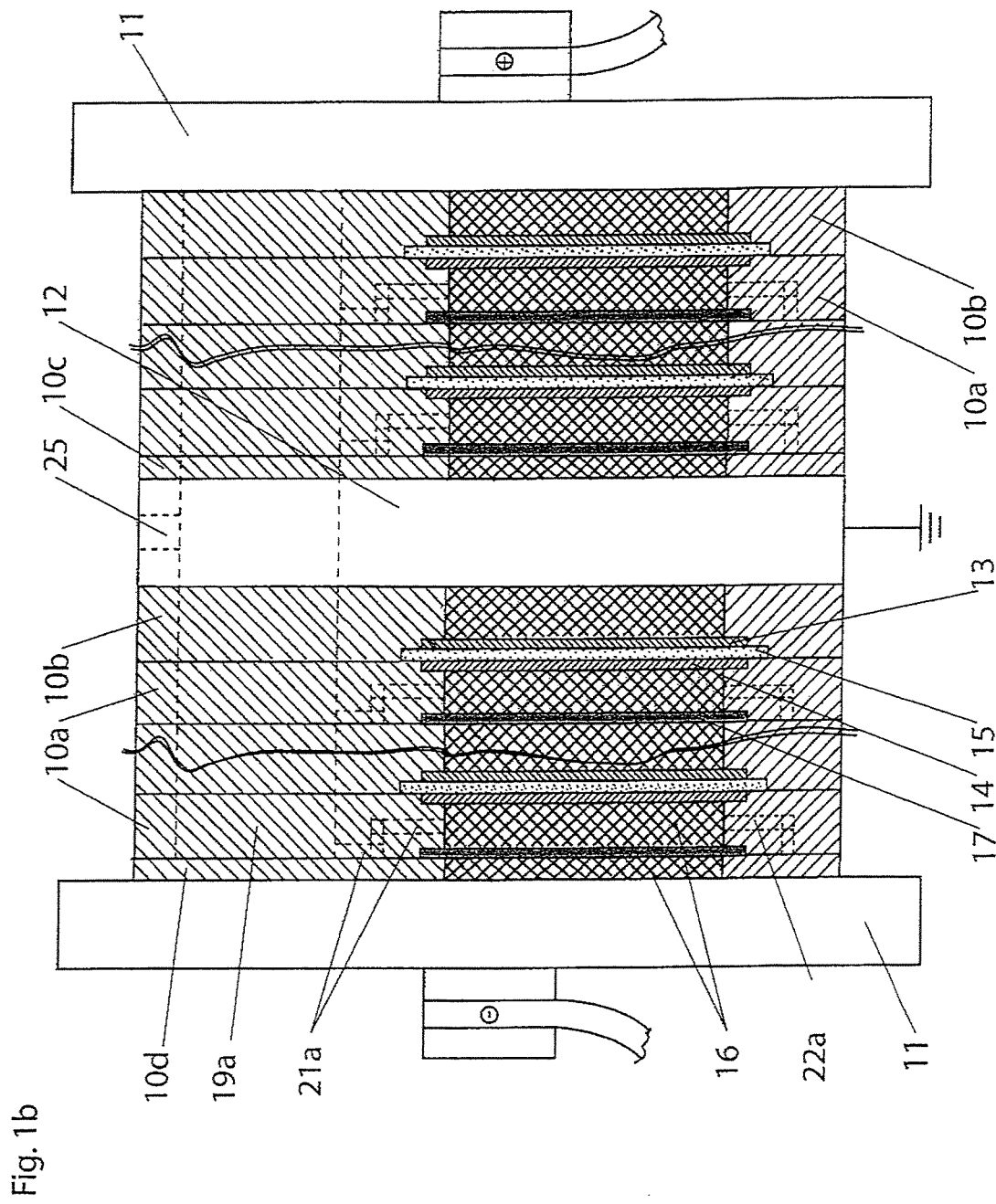
FIG. 1b is a side sectional view of selected portions of a full electrolyser module in accordance with the present invention.
Figure 1C:
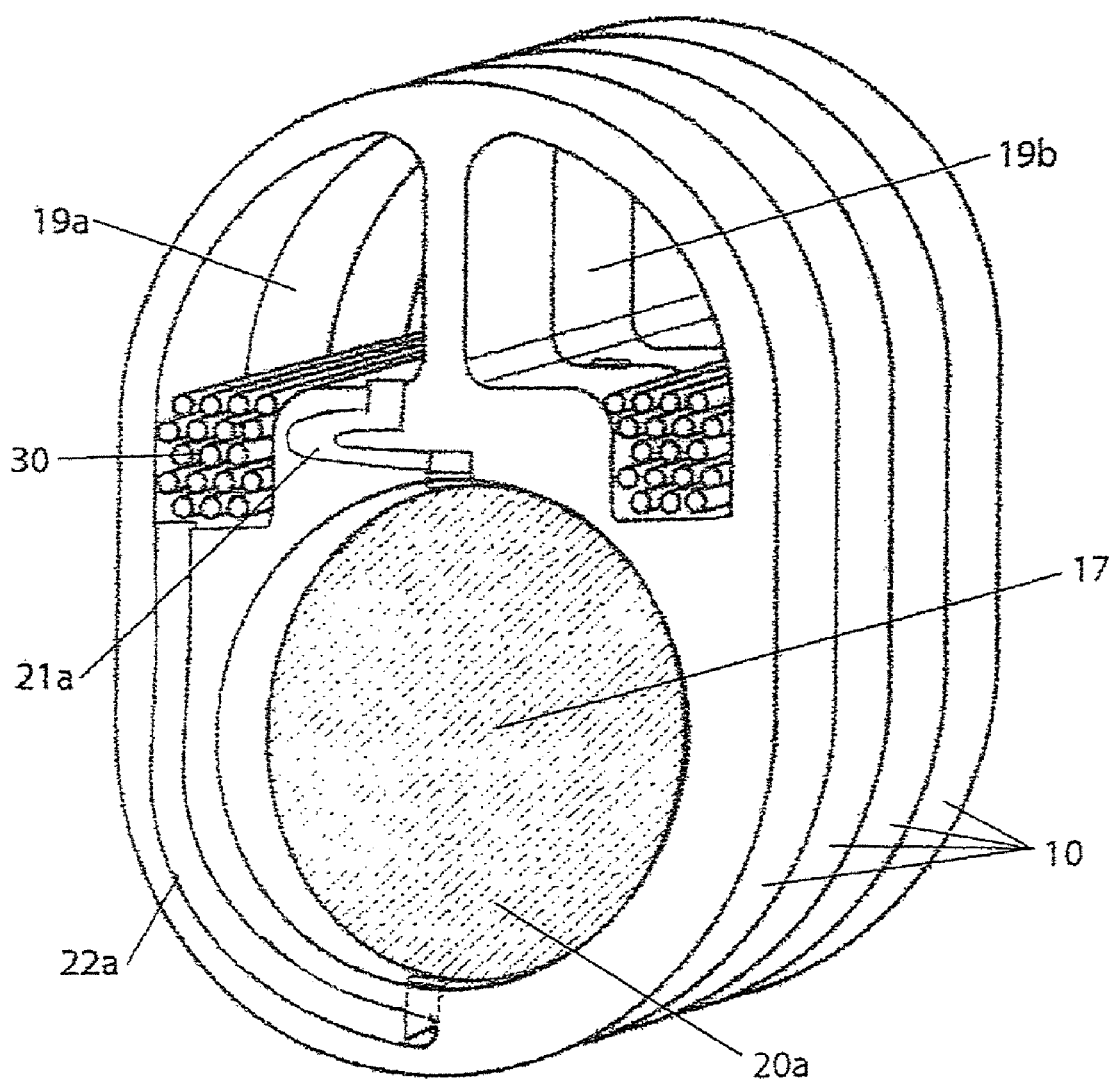
FIG. 1c is an isometric view illustrating part of an assembled electrolyser module.

An electrolyser module in accordance with an aspect of the present invention is shown generally at 1 in FIGS. 1-3. FIG. 1a shows about half of an electrolyser module with 4 cells for illustrative purposes only; the other half of the electrolyser module would be a mirror image (on either side of feature 12, which in this case represents the midpoint of the electrolyser module). In practice, typically greater numbers of cells would be incorporated. For further clarity, FIG. 1b shows an axial view corresponding to section A-A in FIG. 1a, extended to show selected portions of a full electrolyser module, and FIG. 1c shows an isometric view of a section of an electrolyser module. Electrolyser module 1 includes structural plates 10, end pressure plates 11, intermediate pressure plate 12, anodes 13, cathodes 14, membranes 15, current carriers 16 and bipolar plates 17. In the embodiment shown in FIGS. 1a, 1b and 1c, there are two main types of structural plates 10: cathode structural plates 10a and anode structural plates 10b. Additional special structural plates 10c and 10d are located between the adjacent cathode structural plates 10a, and one side of the intermediate pressure plate 12 and one of the end pressure plates 11, respectively. Suitable sealing gaskets (not shown) also are understood to be included. Electrolyser module 1 thus comprises a plurality of electrolysis cells 18 and associated degassing chambers 19. The electrolysis cells 18 preferably are located at the bottom part of the electrolyser module 1, and the associated degassing chambers 19 preferably are located at the top part of the electrolyser module 1, surmounting the electrolysis cells 18. The electrolysis cells comprise cathode and anode half cell chambers 20a and 20b defined by two adjacent structural plates, as well as a cathode 14, an anode 13, a membrane 15, and the current collectors 16. Bipolar plates 17 physically separate and electrically connect adjacent cells. As shown in FIGS. 1a, 1b and particularly 1c, each cathode half cell chamber 20a is directly connected to the hydrogen degassing chamber 19a by a gas-liquid passage 21a, and a degassed liquid passage 22a. Similarly, each anode half cell chamber 20b is directly connected to the oxygen degassing chamber 19b by a gas-liquid passage 21b, and a degassed liquid passage 22b. Consequently, the internal fluid flow requirements for electrolyser module 1 are provided for by the features of each half cell, rather than by features extending across all the cells or a large number of cells, such as gas-liquid manifolds and degassed liquid manifolds, which present an increasing pressure drop as their length is increased. Electrolyser module 1 thus is an inherently scaleable structure, in that not only the number of cells and the size of the degassing chambers, but also the fluid circulation capabilities, automatically scale with the number of cells in the electrolyser module. Furthermore, electrolyser module 1 does not require a mechanical electrolyte pump(s) to facilitate circulation of fluids between the half cell chambers and the degassing chambers; the fluid flows are driven by gas buoyancy and gravity head, and thus are self-regulating in that they automatically vary with the gas production rates. (Most commercial electrolyser modules utilize mechanical electrolyte pumps to facilitate circulation of fluids (electrolyte and electrolyte-gas mixtures) in the electrolyser module.)

The cell portion of the electrolyser module assembly can generally be as is known in the art. The boundaries of each cell are defined by bipolar plates 17, which are thin solid plates made of a suitably conductive and corrosion-resistant material such as nickel to provide electronic conduction of electricity between adjacent cells. Electrical connection between bipolar plates 17 and each of the cathode and the anode in a given cell may be accomplished with suitable electronically conducting current carriers 16, which allow for even current carrying and distribution across the faces of the electrodes 13, 14 and bipolar plates 17, as well as relatively unimpeded fluid flow through the half cell chambers 20. Examples of suitable materials and configurations for current collectors are known in the art, including woven nickel layers or nickel foam. In some embodiments, the bipolar plates 17 can be dimpled, corrugated, etc., and thereby can provide direct connection between the cathodes 14 and anodes 13 without using separate current carriers 16. In this approach without separate current carriers, the dimpled, corrugated, etc. portions can optionally be welded to the cathodes 14 and anodes 13 to provide one-piece sub-assemblies. The membranes 15 are located between and in close proximity to or in contact with the respective adjacent cathodes 14 and anodes 13. The membranes 15 thus lie essentially in the middle of the cells 18, and separate the respective anode and cathode half cells. The membranes 15 may be micro-porous diaphragms which are fully wetted during operation to exclude gases, or non-porous ion exchange membranes. The cathodes 14 and anodes 13 can be as is generally known in the art, for example, catalytic metal coatings coated onto a suitable substrate, for example, nickel mesh. Electrical current is supplied to the cell portion of electrolyser module 11 by, for example, a DC power supply, via electrical connections to end pressure plates 11 and optionally intermediate pressure plate 12. One possible electrical configuration is shown in FIG. 1b, with negative and positive current carrying connections to end pressure plates 11, and a non-current carrying ground connection to intermediate pressure plate 12.

During operation of electrolyser module 1, hydrogen gas is evolved at the cathodes and is released into the cathode half cell chambers 20a, where it forms hydrogen gas-liquid electrolyte mixtures that rise and travel to the hydrogen degassing chamber 19a through the gas-liquid passages 21a. Similarly, during operation, oxygen gas is evolved at the anodes and is released into the anode half cell chambers 20b, where it forms oxygen gas-liquid electrolyte mixtures that rise and travel to the oxygen degassing chamber 19b through gas-liquid passages 21b. In both cases, the liquid is separated from the gas in the degassing chambers, and degassed liquid returns to the respective half cell chambers 20a and 20b through degassed liquid passages 22a and 22b. Separated hydrogen gas exits through separated hydrogen gas outlet 25 in the hydrogen degassing chamber; separated oxygen gas exits through a similar separated oxygen gas outlet in the oxygen degassing chamber (not shown).

Further detail of a hydrogen degassing chamber in the electrolyser module assembly according to the current invention is shown in FIG. 2. Only a section of the hydrogen degassing chamber 19a corresponding to a few structural plates 10) is shown in FIG. 2, which is for illustrative purposes only. The configuration and size of the oxygen degassing chamber 19b can be, but are not necessarily, similar to those of the hydrogen degassing chamber 19a. It is to be understood that the use of more than one hydrogen degassing chamber and similarly the use of more than one oxygen degassing chamber can be contemplated. The degassing chamber volume is defined by the series of adjacent degassing chamber openings (19a or 19b) in the plurality of structural plates 10. Cooling conduits such as cooling coils or, as illustrated, cooling tubes 30 for cooling the incoming gas-liquid mixtures as may be required are located in the lower section of the degassing chambers 19a and 19b. The electrolyser module 1 includes respective gas discharge and feed water passages extending therethrough and fluidly communicating with the degassing chambers 19a and 19b for gas discharge from each degassing chamber and for feed water introduction into at least one of the degassing chambers, preferably the hydrogen degassing chamber 19a (since water is consumed in the cathodic hydrogen generation reaction). Water addition means (not shown) add water through the feed water passages as required to one or more of degassing chambers 19a and 19b, where the added water is mixed thoroughly with electrolyte before distribution to the half cell chambers 20a and 20b (via degassed liquid passages 22a and 22b). Thus, the degassing chamber 19a has multiple functions: firstly, to separate the incoming gas-liquid mixtures into separated gas and separated liquid; also, to cool the fluids as may be required, for example to maintain appropriate cell operating temperatures; and further, to provide a volume for mixing of feed water with electrolyte before distribution to the respective half cell chambers. During operation of the electrolyser module 1a, the gas-liquid mixture from the corresponding cathode half cell chambers enters the hydrogen degassing chamber 19a from gas-liquid passages 21a. Although only one gas-liquid passage per cathode half cell is shown, it is understood that a plurality of gas-liquid passages per half cell may be used. The gas portion of the incoming gas-liquid mixture rises in the degassing chamber volume, and is thereby separated from the liquid portion of the incoming gas-liquid mixture. Means for promoting gas-liquid separation, such as baffles, also can be used to promote gas-liquid separation in a given degassing chamber volume. The separated and partially cooled gas is removed from the degassing chamber 19a in the electrolyser module 1 via at least one separated gas discharge outlet 25 at one or more suitable locations near the top of the degassing chamber 19a. The separated and cooled liquid is returned to the cathode half cell chambers via the corresponding degassed liquid passages 22a. Although only one degassed liquid passage per cathode half cell is shown, it is to be understood that a plurality of degassed liquid passages per cathode half cell may be used.

In the embodiment illustrated in FIG. 2, flow directing means 35 are added to direct the incoming gas-liquid mixture from the gas-liquid passages along the length of the degassing chamber. This configuration is preferred when the point of connection of the gas-liquid passage 22a to degassing chamber 19a lies below the intended range of operating liquid levels. Benefits of this configuration include: (i) extensive "automatic" mixing of feed water added to degassing chamber 19a to enable uniform distribution to all the half cells, even when the feed water is introduced above the liquid level; (ii) avoidance of disturbance of the gas layers at the top of degassing chamber 19a by incoming gas-liquid mixtures, and improved gas-liquid separation efficiency; (iii) improved heat transfer coefficients for the cooling conduits in degassing chamber 19a; and, (iv) avoidance of excessive gas carry under back to the half cells. These benefits are accrued while maintaining good fluid flow across the width of degassing chamber 19a, since the points of connection of gas-liquid passages 21a and degassed liquid passages 22a are on opposite sides of degassing chamber 19a. Fluid flow modeling indicates that without any flow directing means, there is very little flow along the length of degassing chamber 19a. The flow directing means 35 as shown comprises a "hood" over the point of entry of gas-liquid mixture into degassing chamber 19a, consisting of at least one and up to three "walls" and a "roof", with the opening to the degassing chamber corresponding to the intended direction of fluid flow. The "walls" and "roof" may be angled or otherwise oriented as may be appropriate to obtain desired fluid flow patterns. While the "hood" structure is relatively easily manufactured and presents relatively little resistance to fluid flow, it is to be understood that other flow directing means can be used, for example, a bent tube extending from the gas-liquid passage into the degassing chamber 19a.

The electrolyser module corresponding to the embodiment illustrated in FIG. 2 is inherently highly scaleable, since the same general fluid flow patterns can be expected over a wide range of the number of cells in the module, and the degassing chamber volume and degassing capacity scale automatically with the number of cells, or more particularly, with the number of structural plates in the electrolyser module. Furthermore, even with few and significantly separated points of feed water addition, and even with feed water introduction via the top of the liquid, good mixing of feed water in the degassing chamber and uniform distribution to the connected half cells can be achieved over a wide range of the number of cells in the electrolyser module. Similarly the cooling capacity of the module also is scalable with the number of cells in the electrolyser module by adding cooling conduit length proportionally, and also optionally varying the coolant flow rate.

A structural plate for an electrolyser module according to the current invention is shown in FIG. 3. FIG. 3 shows a preferred embodiment in which each structural plate 10 defines one half cell chamber opening 20 and two degassing chamber openings 19a and 19b; it is understood that each structural plate can define more than one of each type of opening. Structural plates associated with anode half cells are called anode structural plates, and structural plates associated with cathode half cells are called cathode structural plates. Each structural plate 10 also comprises one or more gas-liquid passages 21, which directly connect the top part of the half cell chamber opening 20 to one of the degassing chamber openings 19a and 19b. Each structural plate 10 further comprises one or more degassed liquid passages 22, which directly connect the bottom part of the half cell chamber opening 20 to one of the degassing chamber openings 19a and 19b. Although only one gas-liquid passage 21 and one degassed liquid passage 22 are shown in FIG. 3, it is to be understood that a plurality of each type of passage can also be used. In anode structural plates, the degassing chamber that is directly connected to the anode half cell chamber is an oxygen degassing chamber, and in cathode structural plates, the degassing chamber that is directly connected to the cathode half cell chamber is a hydrogen degassing chamber.

The degassing chamber openings 19a and 19b may be considered to have an upper section and a lower section. Separated gas rises into the upper section and degassed liquid descends into the lower section. The discharge opening of the gas-liquid passage 21 is preferably located to avoid introducing gas into the degassed liquid and liquid into the gas. Accordingly the gas-liquid passages 21 enter the degassing chambers 19a and 19b at a location above the entrance to the degassed liquid passages 22 but below the upper section of the degassing chamber openings 19a and 19b. In other words the discharge opening is therefore in the lower (preferably lowest) region of the upper section.

The structural plate 10 further comprises a fluid flow directing means 35 at the point of connection of the gas-liquid passage 21 to degassing chamber opening 19a; similar fluid flow directing means can also be used if the gas-liquid passage 21 connects to degassing chamber opening 19b. In this embodiment, fluid flow directing means 35 comprises a "hood" over the point of connection of the gas-liquid passage 21 to the degassing chamber opening 19a. The "hood" consists of at least one and up to three "walls" and a "roof", with an opening corresponding to the intended directions of fluid flow. While the "hood" structure is relatively easily manufactured, presents relatively little resistance to fluid flow, and does not adversely affect the structural integrity of the surrounding areas, it is to be understood that other fluid flow directing means can be used; for example, a bent tube shape extending from the gas-liquid passage into degassing chamber opening 19a.

Different structures can be contemplated for the passages for gas-liquid transfer 21 and the degassed liquid passages 22 including; (i) surface channels, i.e., channels defined in the surface of structural plate 10; (ii) internal passages, i.e., passages defined in the interior of structural plate 10; (iii) surface channels that become internal passages in certain sections; and, (iv) internal passages that become surface channels in certain sections. In FIG. 3, the passages are shown as comprising surface passages, except near the points of connection to the half cell chamber opening 20, where the surface passages become internal passages in order to allow for passage under sealing gasket holding features. This approach aids in manufacturability when the passages are long and/or have complex shapes. For large parts, as required to achieve high gas production capacities, the use of structures (i) and (iii) above (surface passages and/or surface passages that become internal passages in certain sections) is preferred and likely is required for manufacturability. It is to be understood that in principle, any of the four different passage structures contemplated can be used for any given passage, and combinations of the different approaches for the passages can be used in any given structural plate. It also is to be understood that in the case of surface passages, the passages can be formed in one or both opposing surfaces of adjacent structural plates. It is to be further understood that while each set of gas-liquid passages 21, and degassed liquid passages 22, typically are defined in a single structural plate, more complex structures, in which passages cross multiple structural plates with appropriate sealing between structural plates, also can be considered. For example, the gas-liquid passage in a given structural plate can become an internal passage at an appropriate point in its path, and then travel through the width of its structural plate to the opposite face of the structural plate, then through the width of an adjacent structural plate, and finally onto the near face of the next structural plate, where the passage continues its path as a surface passage to the corresponding degassing chamber opening, optionally becoming an internal passage near the point of connection to the degassing chamber opening. Appropriate sealing is included at the points where the passage crosses between adjacent structural plates. A similar structure can be used for the degassed liquid passages. It is to be understood that the gas-liquid passages and the degassed liquid passages can cross multiple plates. Note that multi-plate configurations also are inherently scaleable, and do not include common internal fluid collection manifolds or external piping for gas-electrolyte or electrolyte transfer.

The lengths and cross-sectional areas of the passages for gas-liquid transfer 21 and the degassed liquid passages 22 are the primary determinants of stray currents (also known as bypass currents) and the current efficiency of the electrolyser module. The main path for current flow in an electrolyser module is through the cells, which is the desired gas-producing path. In the current embodiment, ionic current can flow through the electrolyte in the gas-liquid passages and in the degassed liquid passages. The amount of this so-called stray current or bypass current that bypasses the cell path via the gas-liquid passages and the degassed liquid passages depends on the relative resistances of the cell path and the passages. Deleterious effects of stray currents include loss of gas-producing current (lower current efficiency) and potential stray current corrosion of metal (especially steel) parts exposed to electrolyte. For any given electrolyte concentration and temperature, the resistance of the passages depends on: (i) the length of the passages; (ii) the cross-sectional area of the passages; and, (iii) the void fraction (gas fraction) for the fluids in the passages.

The lengths and cross-sectional areas of the gas-liquid passages 21 and of the degassed liquid passages 22 also are key determinants of fluid flow rates and void fractions (indicative of the extent of gas hold up) in the electrolyser module. While stray currents decrease as passage lengths are increased and as passage cross sectional areas are decreased, conversely fluid flows are increasingly restricted. Restriction of fluid flows is of course undesirable, and sufficient liquid circulation is required in the electrolyser module, for example, to maintain low void fractions and good heat transfer characteristics. Consequently, design of the electrolyser module requires a compromise between control of stray currents and facilitating good fluid flows.

In the current embodiment, the passage cross sectional areas are enlarged by using a "slot" geometry; i.e., although the passage dimension corresponding to the thickness of the structural plate is limited, a slot geometry that is elongated in the perpendicular direction of the same surface can be used to provide a significant cross sectional area, which in turn allows for good fluid flow and circulation in the electrolyser module. The corresponding passage length is selected so as to increase the electrical resistances associated with the passage paths, and achieve current efficiencies of, e.g., 99% or higher (i.e., 99% or more of the current passed through the electrolyser module goes through the cells and produces gases). The passages can be elongated through the use of various passage path geometries. The void fraction in the degassed liquid passages typically can be expected to be very low, and the resistivity of the fluid in the passages will be close to that of the liquid electrolyte. The void fraction in the gas-liquid passages typically can be expected to be significant, e.g., 0.1 to 0.5, during operation of the electrolyser module. Thus, the degassed liquid passages typically are longer and/or have a smaller cross-sectional area than the gas-liquid passages. Alternatively, a greater number of gas-liquid passages can be used. Generally speaking, the use of complex passage configurations may be required in order to attain high current efficiencies; this is most important for large electrolyser modules with high gas production capacities and correspondingly large passage cross sectional areas. In the embodiment shown in FIG. 3, the ratio of maximum hydrogen generation rate per half cell, i.e., the maximum hydrogen flow rate through the gas-liquid passage (in $Nm^3/h$) to the cross sectional area of the gas-liquid passage (in $cm^2$) is 0.83, (maximum hydrogen generation rate per hydrogen half cell of 2.5 $Nm^3/h$ and cross sectional area of the gas-liquid passage of 3 $cm^2$) and the passage aspect ratio, i.e., the ratio of the length of the gas-liquid passage to its cross sectional area is 23. In cases where the cross sectional area of the gas-liquid passage varies or there is more than one gas-liquid passage, an average value could be used as an estimate. Electrolyser module designs with significantly larger values of these ratios can be considered to have significantly restricted fluid flows and fluid circulation, and concomitant potentially serious issues with heat removal from and excessive voiding of the half cell chambers. A recommended maximum value for the ratio of the maximum hydrogen generation rate (in $Nm^3/h$) to the cross sectional area of the gas-liquid passage (in $cm^2$) is about 2. A recommended maximum value of the aspect ratio of the hydrogen gas-liquid passage is about 30.

Examples of structural plates 10 for an electrolyser module according to the current invention with different passage configurations are shown in FIG. 4. Most of the lengths of the passages are surface passages, which enables the use of long passages with complex shapes. The surface passages can optionally become internal passages in the vicinities of the points of connection to the half cell chamber opening 20 and to the degassing chamber opening 19a to facilitate holding features for locating and holding sealing gaskets. In the embodiment shown in FIG. 4i, the gas-liquid passage 21i extends from the top part of half cell chamber opening 20 upward and over the top of the degassing chamber opening 19a, before connecting to the bottom part of the degassing chamber opening 19a. The degassed liquid passage 22i extends from the opposite side of degassing chamber opening 19a, down and around the periphery of the half cell chamber opening 20 on the same side of the structural plate before connecting to the bottom part of the half cell chamber 20. In the embodiment shown in FIG. 4ii, the gas-liquid passage 21ii extends from the top part of the half cell chamber 20 substantially vertically upward from the half cell chamber opening, and then returns substantially downward before connecting to the bottom part of the degassing chamber opening 19a. In the embodiment shown in FIG. 4iii, the gas-liquid passage 21iii extends from the top part of half cell chamber opening 20 and under the corresponding degassing chamber opening 19a, joining the bottom part of the degassing chamber opening 19a at the far side. The degassed liquid passage 22iii extends from the opposite side of the degassing chamber opening 19a, down and around the periphery of the half cell chamber opening 20 on the opposite side of the structural plate before connecting to the bottom part of the half cell chamber opening 20. In the embodiment shown in FIG. 4iv, the gas-liquid passage 21iv extends from the top part of the half cell chamber opening 20 and part way under the corresponding degassing chamber opening 19a, then doubles back over itself before joining the bottom part of the degassing chamber opening 19a at the near side.

The structural plates 10 preferably are made of a suitable electrically insulating polymeric material that is inert to electrolyte (e.g., an aqueous solution of 25% to 35% KOH) and gases (e.g., oxygen, hydrogen, nitrogen, or chlorine), as well as other potential materials to which it may be exposed, such as ammonium hydroxide. Examples of suitable thermoplastic materials include polyphenylene oxide (PPO), polyphenylene sulphide (PPS) and the like, and in particular polysulfone. Thermoset polymeric materials also may be used. The plates may be manufactured by conventional molding techniques, such as injection molding or casting, or by conventional machining techniques, such as milling and drilling. Manufacturing by molding techniques enables consideration of reduction of material in the structural plates 10 through inclusion of additional openings, coring, or the like (for moldability, weight, cost, and potential strain relief considerations), as well as the use of complex shapes for the body, the half cell chamber openings, the degassing chamber openings, the gas-liquid passages, and the degassed liquid passages. For example, stray current blocking walls can be straightforwardly added to the bottom portion of one or more of the degassing chamber openings (extending at higher than the highest anticipated operating liquid level) of special structural plates that can be used at appropriate points in an electrolyser module to control stray current flows. Furthermore, given potential limitations in the sizes of parts that can be manufactured, forming of structural plates in multiple portions that can be interconnected or joined to form a complete structural plate also is contemplated.

The structural plates further comprise first and second opposing surfaces which define holding features for locating and holding functional cell components, including electrodes (anodes and cathodes), membranes, and bipolar plates. These holding features enable proper location and alignment of functional components in an assembled electrolyser module. Each holding feature for a given functional component comprises an "L" shaped seat, which surrounds the corresponding half cell chamber opening. Each "L" shaped seat comprises a seat back and a seat wall, which preferably are orthogonal to one another. Each "L" shaped seat faces inward toward the half cell chamber opening. The functional components are sized to "sit" fully in the seats, such that one planar surface of the electrode, membrane or bipolar plate is generally in the same plane as the surface of the structural plate in which it is supported.

The structural plates further comprise first and second opposing surfaces which define holding features for locating and holding sealing gaskets. The seals may be as is known in the art to prevent leakage of gas, liquid, or gas-liquid mixtures (a) from inside the electrolyser module to the outside; and, (b) from inside the chambers or passages in which they are contained. Such seals may include, but are not limited to, for example flat gaskets or preferably o-rings. In the case of flat gaskets, other features such as ribs may be added to one or more of the opposing surfaces. For some features, especially where sealing is not critical, interlocking features or crush ribs, without sealing gaskets, may also be used. Typically, the main holding features for locating and holding sealing gaskets are firstly those surrounding all or at least part of one or more of degassing chamber openings, those surrounding the half cell chamber opening, and also the main exterior seals surrounding all the fluid-containing volumes, including all of the two or more degassing chamber openings, the half cell chamber opening, the one or more gas-liquid passages and the one or more degassed liquid passages. The use of multiple seals and holding features for locating and holding sealing gaskets also can be contemplated.

When structural plates 10 are arranged together to form the electrolyser module 1 in the embodiment of FIG. 1, the first surface of one structural plate is aligned with the second surface of the adjacent structural plate such that the functional components and sealing gaskets are aligned with their respective holding features, in order that cathodes 14, membranes 15, and anodes 13 are supported by their respective structural plates, and the half cell chambers, degassing chambers, and the perimeter of the electrolyser module are sufficiently sealed.

The sizing of the structural plate 10 in the embodiments of FIGS. 3 and 4 depends on the required sizes and shapes of the half cell chamber opening, degassing chamber openings, and to some extent, on the required sizes and paths of the gas-liquid passages and the degassed liquid passages. The half cell chamber opening is sized according to the required or appropriate active electrode area for a given operating range of current densities and number of cells in the electrolyser module. The anode and cathode nominal (projected geometric) surface areas, as well as the nominal membrane surface areas, generally are maintained equal, but this is not necessarily a requirement. The sizes, shapes and configurations of the degassing chamber openings and the gas-liquid passages and for degassed liquid passages are then subsequently sized as required to obtain target liquid flow rates, void fractions, and gas-liquid separation efficiency.

The overall thickness of the structural plate 10 in the embodiments of FIGS. 3 and 4, as measured between its opposing surfaces, may vary depending on the application, part diameter, material(s) of construction, operating pressure, operating temperature, manufacturing method, etc., but must be sufficient to accommodate the gas-liquid passage 19 and degassed liquid passage 22. For example, for water electrolysis, the overall thickness may be in the range of 0.4 to 1.5 cm, and more preferably, 1.0 to 1.5 cm for larger diameter structural plates. Notably, the actual plastic thickness at any given point in a larger diameter structural plate typically is less than the overall part thickness, due to manufacturability considerations (e.g., for manufacturing by injection molding).

In general, shapes without sharp corners are preferred for the body of structural plate 10, the half cell chamber opening 20, and the degassing chamber openings 19a and 19b in the embodiments of FIGS. 3 and 4, in order to avoid stress concentrations. Specific shapes depend on the design requirements, for example to accommodate different passage paths, to achieve required structural strength, and to accommodate sizes required to achieve good fluid flows and gas-liquid separation, etc. For example, the degassing chamber openings 19a and 19b preferably have an irregular shape with rounded corners, but also may have a rectilinear shape with rounded corners or a rounded shape.

Electrolyser module 1 is shown in the embodiment of FIG. 1b as being held together between end pressure plates 11 on either end. A compression system to apply sealing pressure to either end of module through end pressure plates 11, as is well known in the art, also is used. For example, a number of tie rod assemblies using Belleville washer stacks, with the tie rods located either around the outside of the main body of the electrolyser module, and/or going through the body of the electrolyser module, can be used to maintain sealing pressure on the module. The end pressure plates 11 comprise a body and can be made of steel, stainless steel, nickel-plated steel, nickel-plated stainless steel, nickel, or nickel alloy. The bodies of the end pressure plates 11 are electrically conducting, and typically are used to facilitate electrical connection to electrolyser module 1, using appropriate electrical connection means as are known in the art.

Electrical current as applied to the cell portions of electrolyser module 1 by, for example an external DC power supply passes through the end pressure plates as electronic current, then through the adjacent current carrier 16 to the cathode 14, where electrons react with water to produce hydrogen and hydroxyl ions. The hydroxyl ions carry the current through the membrane 15 to the anode 13, where hydroxyl ions react to produce oxygen, water, and electrons. The current then passes as electrons through the adjacent current carrier 16 to, and then through the bipolar plate 17 to the adjacent cell. Analogous processes occur at the intermediate pressure plate 12, and also at the other end of the electrolyser module 1 (not shown), where electrons pass through the metallic end pressure plate 11 and then back to the external DC power supply to complete the electrical circuit.

In the embodiment shown in FIG. 1b, one of the end pressure plates 11 and one side of the intermediate pressure plate 12 are used directly to define one side of the end (adjacent) half cell chambers (defined by bipolar plates 17 or intermediate pressure plate 12 in the other half cells). Special structural plates 10d and 10c are placed adjacent to the other end pressure plate 11 and the other side of the intermediate pressure plate 12, respectively. These special structural plates do not have gas-liquid passages 21 or degassing passages 22. The special structural plates 10d next to the end pressure plates 11 have half cell chamber openings 20, but do not have degassing chamber openings 19. The special structural plates 10c next to the intermediate pressure plates 12 have half cell chamber openings 20 and degassing chamber openings 19. The purpose of the special structural plates is to provide an opposing insulating face opposite the channels in the surfaces of the adjacent structural plates 10a to form the gas-liquid passages and the degassed liquid passages.

Even with special structural plates 10*d* and 10*c*, the end pressure plate and the intermediate pressure plate can be used directly to define one side of the adjacent half cell chambers (by using correspondingly thicker single current carriers 16). However, in an alternative embodiment, bipolar plates 17 can be seated in the special structural plates 10*d* and 10*c* to define one side of the adjacent half cell chambers. In this case, thinner current carriers can be used to provide electrical connection between the bipolar plates 17, and the adjacent end pressure plates 11 and the intermediate pressure plate 12. Of course, this configuration can be used at both end plates 11, and on either side of the intermediate pressure plate(s) 12. This alternative embodiment is advantageous in that the bodies of the end pressure plates 11 and the intermediate pressure plates 12 are not exposed to potentially corrosive electrolyte.

In another alternative embodiment, appropriately sized nickel sheets or plates may be inserted into holding features in the special structural plates 10*c* and 10*d* located adjacent to the end plates and the one or more intermediate plates, or alternatively in recesses in the bodies of the end pressure plates and also on both opposite faces of the one or more intermediate pressure plates, the nickel sheets or plates thereby being located so as to face and correspond to the adjacent half cell chambers. Appropriate sealing may also be used to ensure that electrolyte contact is limited to the nickel sheets or plates. This alternative embodiment also is advantageous in that the bodies of the end pressure plates 11 and the intermediate pressure plates 12 are not exposed to potentially corrosive electrolyte. In this regard, the degassing chamber openings in the intermediate pressure plates 12 also can include an insulating insert or sleeve, or alternatively, can be coated with an insulating material.

Figure 9:
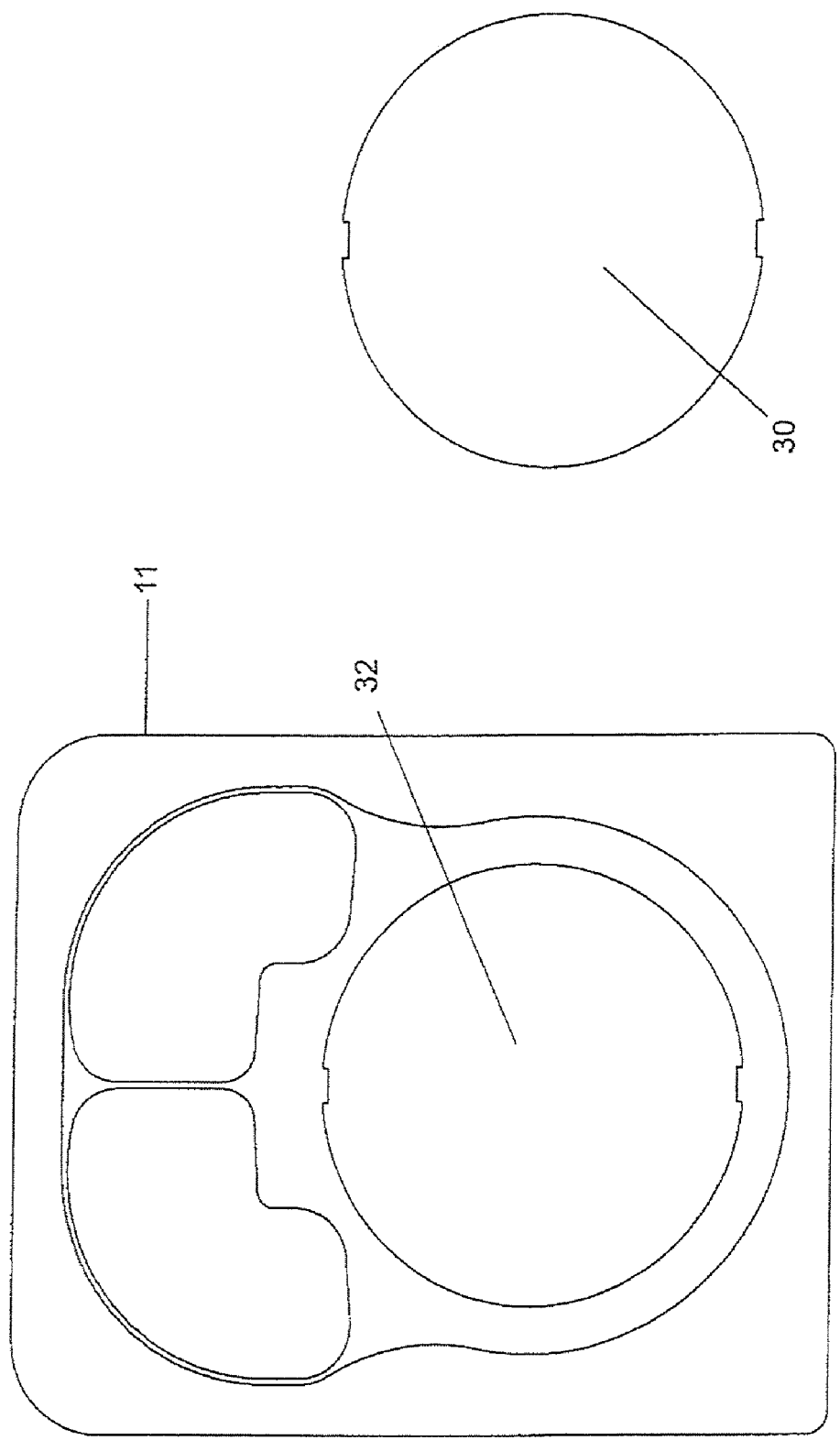
FIG. 9 is a front view illustrating an alternate embodiment of end pressure plate according to the present invention.

FIG. 9 is a front view illustrating an end pressure plate II utilizing a nickel plated insert 30 mounted within a recess 32 as suggested above. FIGS. 10 and 11 are front views illustrating an intermediate pressure plate 12 utilizing a nickel plated insert 40 received in a through hole 42 and retained by retaining tabs 44 secured to the intermediate pressure plate 12.

Preferably one or more intermediate pressure plates 12 are also included in the electrolyser module; in the case of one intermediate pressure plate 12, it is preferably located at the midpoint of the electrolyser module (i.e., with an equal number of cells on either side). The body of the intermediate pressure plate 12 is electrically conducting, and typically is used to facilitate electrical connections to electrolyser module 1. These electrical connections can be current carrying power connections, or non-current carrying connections for grounding purposes only. Depending on the configurations for electrical connections to the electrolyser module 1, connections for external piping, e.g., for coolant circulation, feed water addition, product gas discharge outlets, inert gas introduction, connection of the lower sections of the degassing chambers, and drains can be made to the one or more of the end pressure plates 11 and intermediate pressure plates 12. The lower sections of the degassing chambers can be connected by passages in the body of the one or more intermediate pressure plates 12 or the body of one or both end pressure plates 11. Additional intermediate pressure plates 12 can be included, located so as to divide the total number of electrolysis cells into sections containing equal numbers of cells, depending on the configuration for electrical connections to the electrolyser module 1.

In the case of very small electrolyser modules, it may be possible to eliminate the intermediate pressure plate 12. In such a case, only the structural plates 10 would be mounted directly between the end pressure plates 11 and connections for external piping would be made through the end pressure plates 11.

As illustrated in FIGS. 10 and 11, it isn't necessary to provide the intermediate plates 12 with gas liquid separator chamber openings. A function of the intermediate plates 12 is to provide a location for withdrawl of gas from the gas liquid separator chambers on either side thereof. This may be achieved with through holes 50 which in effect are "banjo" fittings mounted between opposite sides of the intermediate plates 12. The through holes 50 fluidly communicate with the gas liquid separator chambers 19*a* and 19*b* on opposite sides thereof and with fluid conduits 52 extending generally radially from the intermediate pressure plate 11.

The intermediate pressure plates 12 comprise a body that can be made of steel, stainless steel, nickel-plated steel, nickel-plated stainless steel, nickel, or nickel alloy. Two or more degassing chamber openings are defined in the body, typically, but not necessarily, corresponding to the degassing chamber openings in the structural plates used in the same electrolyser module. The intermediate pressure plates 12 also can include protective plastic or reinforced plastic inserts fitted into the degassing chamber openings, to protect the body material against stray current corrosion. The inserts also can incorporate stray current blocking walls, which are walls of electrically insulating material such as plastic that block most of one or more of the degassing chamber openings in the intermediate pressure plate 12, leaving some open space near the top of the degassing chamber openings to allow for gas flow. Stray current blocking walls also can be located in any of the structural plates 10 in the electrolyser module 1, although the intermediate pressure plates 12 are a preferred location, so as to avoid interference with feed water mixing by stray current blocking walls at points intermediate to feed water addition points.

There are several potential approaches to making electrical power connections to the electrolyser module 1 to pass current through the plurality of electrolytic cells. These approaches can generally be categorized as follows: (a) positive electrical power connection to one of the end pressure plates 11, and negative electrical power connection to the other end pressure plate 11; (b) negative electrical power connection to both end pressure plates 11; and, (c) positive electrical power connection to both end pressure plates 11. In all the above cases, a current carrying electrical power connection can also be made to one or more intermediate pressure plates 12. In case (a), an even number of intermediate pressure plates 12 is used (if intermediate pressure plates are used, then at least two are required); in cases (b) and (c), an odd number of intermediate pressure plates 12 is used (at least one intermediate pressure plate is required). In all cases, the intermediate pressure plates 12 preferably divide the total number of cells into sections of equal numbers of cells, and furthermore, alternating negative and positive electrical power connections to the intermediate pressure plates 12 are located such that negative and positive electrical power connections alternate over the length of the electrolyser module 1.

Figure 5V:
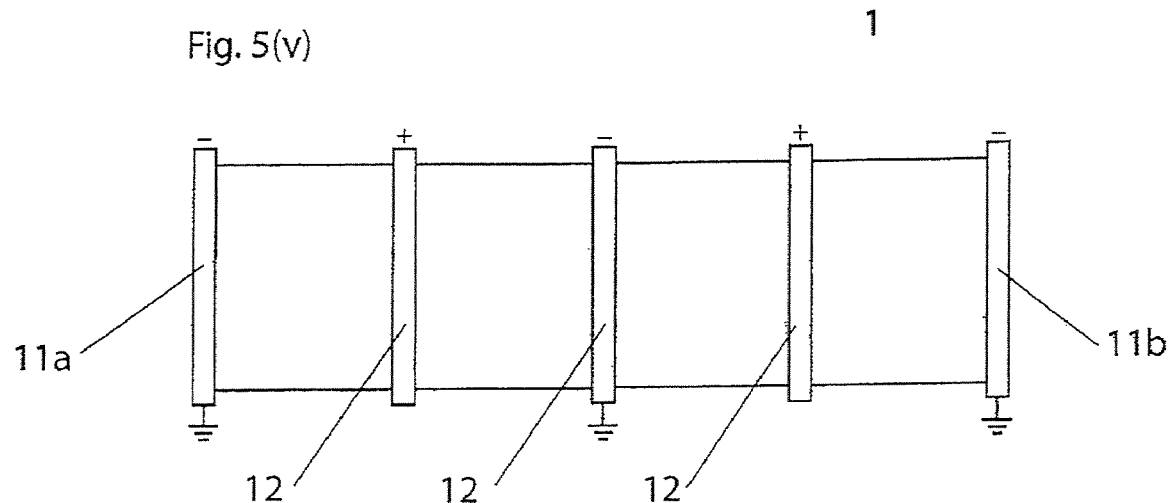
FIGS. 5(i) to 5(vi) show examples of potential electrical connection configurations for an electrolyser module in accordance with the present invention.
Figure 5:
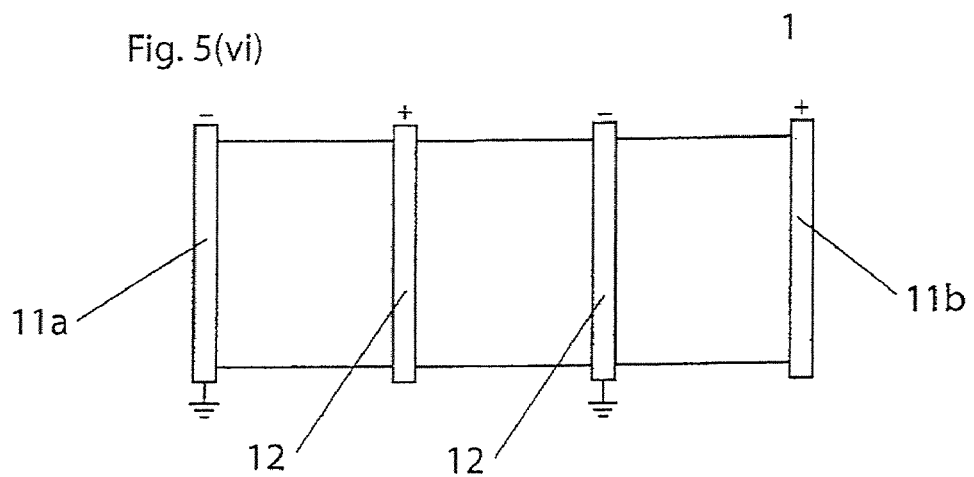

Examples of electrical power connection configurations are depicted schematically in FIGS. 5(i) to 5(iv): (i) negative electrical power connection to one end pressure plate 11*a* and positive electrical power connection to the other end pressure plate 11*b* of the electrolyser module 1; (ii) negative electrical power connection to one end pressure plate 11*a* and positive electrical power connection to the other end pressure plate 11*b*, with a non-current carrying electrical ground connection to an intermediate pressure plate 12 at the midpoint of the electrolyser module 1; (iii) negative electrical power connections to the end pressure plates 11a and 11b, and positive electrical power connection to an intermediate pressure plate 12 at the midpoint of electrolyser module 1; and, (iv) positive electrical power connections to the end pressure plates 11a and 11b, and negative electrical power connection to an intermediate plate 12 at the midpoint of the electrolyser module 1.

The use of electrical power connections to multiple intermediate pressure plates 12 in the same electrolyser module essentially splits the electrolyser module into two or more parallel (or separate) sets of electrical power connections, for example, the configurations illustrated in FIGS. 5(iii) to (vi). Both electronic and ionic current are prevented from passing through intermediate pressure plates 12 by not providing them with gas liquid separation chamber openings, and further by not allowing contact of metal in the intermediate pressure plates with electrolytes by using intervening plastic coating or plastic (with appropriate sealing). Potential advantages of configurations (v) and (vi) include lower stray current driving forces and availability of more potential external piping connection points. As depicted in FIGS. 5(iii), (v) and (vi), the negative electrical power connections can be connected to the same electrical ground. One or more power supplies (AC to DC converters and/or DC to DC converters) can be used to supply DC electricity to an electrolyser module via the electrical power connection configurations described above.

External piping connections generally are made to the negative or grounded intermediate pressure plate(s) 12 or the end plates 11. Illustrative examples of such external piping include: (a) each degassing chamber has one or more gas outlets, which are located in one or more intermediate pressure plates, or in one or both end pressure plates; (b) the degassing chambers can contain one or more sets of cooling conduits, which are connected to one or more external coolant circulation loops through one or more intermediate pressure plates, or through one or both end pressure plates; (c) the degassing chambers can contain means of adding feed water, which are connected to one or more intermediate pressure plates, or one or both end pressure plates; (d) sensors (for level, temperature, pressure, or other measurements) or sensor reservoirs are connected to the degassing chambers through one or more intermediate pressure plates, or through one or both end pressure plates; and, (e) the lower sections of the degassing chambers are connected to one another by external piping through one or more intermediate pressure plates or through one or both end pressure plates.

Figure 6I:
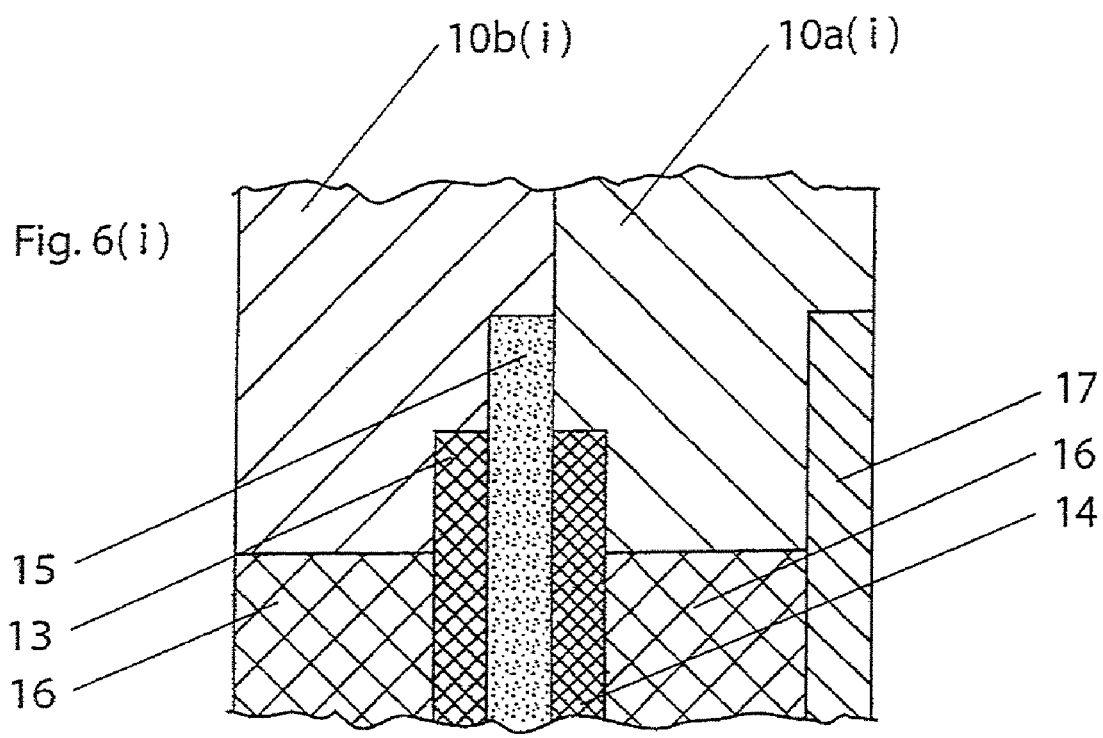
FIGS. 6(i) and 6(ii) show two alternative sets of structural plates in accordance with the present invention.
Figure 6:
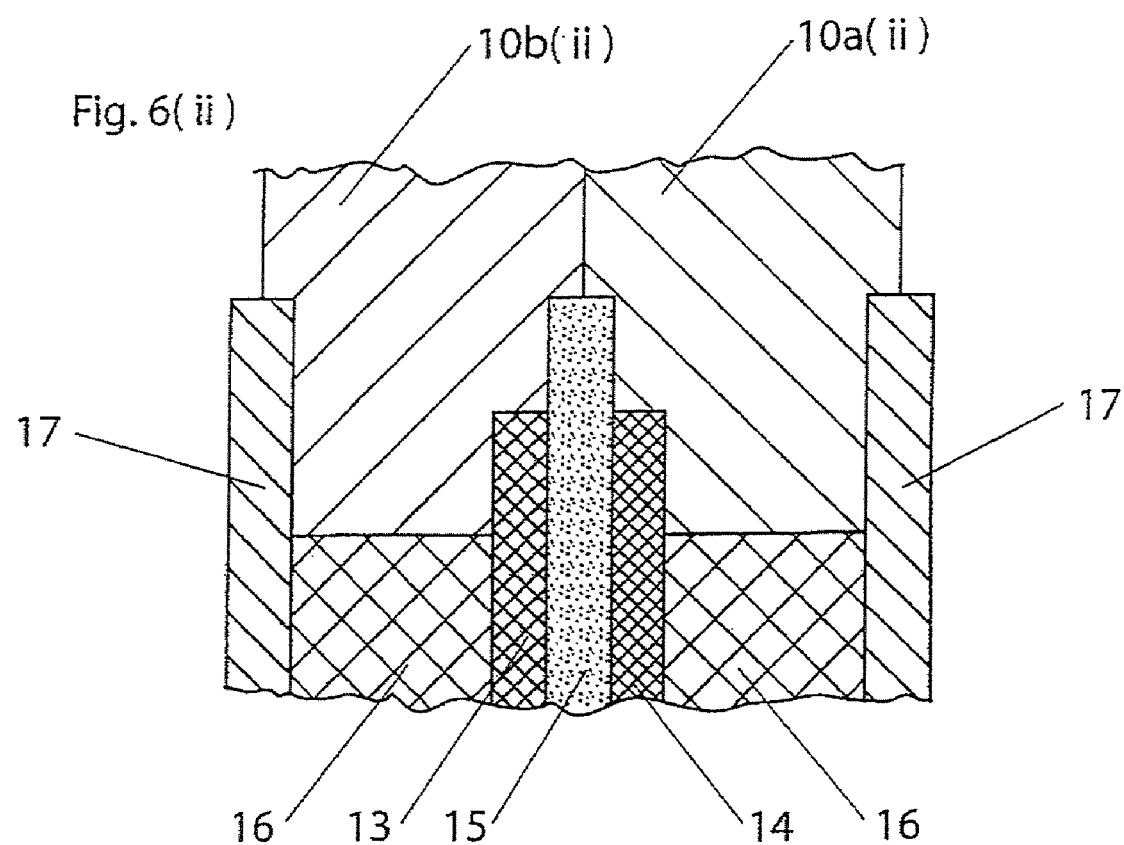

FIGS. 6(i) and 6(ii) show side views of two alternative sets of structural plates, each set being comprised of a cathode structural plate (10a(i) and 10a(ii)) and an anode structural plate (10b(i) and 10b(ii)). The part of the structural plates shown is at the top of the half cells and slightly above. In the first set of structural plates (10a(i) and 10b(ii)), the first surface of the anode structural plate 10b(i) includes two seats, the first innermost seat being for seating anode 13, the second or outermost seat being for seating membrane 15, which defines one side of the corresponding half cell. The opposing surface in an assembled electrolyser module is the first surface of the cathode structural plate 10a(i), which includes one seat for the seating cathode 14. The cathode 14 and the anode 13 thereby "sandwich" and support the membrane 15 on either side. The second surface of the cathode structural plate 10b(i) includes a seat for the bipolar plate 17, which defines the other side of the corresponding half cell, electrically connected to cathode 14 by the current carrier 16. The opposing surface is the second surface of another anode structural plate 10b(i), which in this embodiment does not include any seats for the functional components. To facilitate the above description, the structural plates 10a(i) and 10b(i) have arbitrarily been deemed cathode and anode structural plates, respectively. It should be understood that these can also be anode and cathode structural plates, respectively. Optionally, sealing gaskets (not shown) can be used for sealing the membrane 15 and the bipolar plate 17, in which case the structural plates further comprise the corresponding holding features for locating and holding the sealing gaskets.

In the second set of structural plates (10a(ii) and 10b(ii)), the functional component holding features are the same in the cathode and anode structural plates. In each plate, the membrane seats in the first surfaces and the bipolar plate seats in the second surfaces each effectively are "half seats", which also incorporate holding features for sealing gaskets to seal both faces of the membranes and the bipolar plates. If (i) the gas-liquid passages and the degassed liquid passages (not seen in FIG. 6) become internal passages near and at the points of connection to the half cell chamber opening and to one of the at least two degassing chamber openings; and, (ii) the gas-liquid passages and the degassed liquid passages lie completely on one side of the vertical center line of the structural plate, then, cathode structural plate 10a(ii) can be flipped around and used in the opposite orientation as anode structural plate 10b(ii), which is the mirror image of cathode structural plate 10a(ii), in order that only a single part need be manufactured (with the exception of optional special structural plates, such as special structural plates for placement next to end pressure plates or intermediate pressure plates, or structural plates with stray current blocking walls).

Alternatively, in the second set of structural plates (10a(ii) and 10b(ii)), the gas-liquid passages and the degassed liquid passages can be completely internal passages Manufacture of such plates with completely internal passages can be accomplished by, for example, molding the structural plate in two parts, a first part and a second part. The face area of each of the first part and the second part corresponds to the full face area of the structural plate, and the sum of the thickness of the first part plus the thickness of the second part makes up the full thickness of the structural plate. Each of the first part and the second part has an outer end face and an inner end face, the outer end faces comprising the features of the end faces of the structural plate, and the inner end faces comprising opposite halves of the gas-liquid passages and the degassed liquid passages. The inner faces of the first part and the second part can be bonded together by means known in the art to form structural plates with gas-liquid passages and degassed liquid passage that are completely internal to the structural plates. If the gas-liquid passages and the degassed liquid passages further lie completely on one side of the vertical center line of the structural plate, then only a single type of structural plate need be used (with the exception of optional special structural plates, such as end structural plates, or structural plates with stray current blocking walls).

Embodiments of draining systems for draining of the electrolyser module are as described below. The draining system drains electrolyte from the cathode half cell chambers and the anode half cell chamber, for purposes such as long term shut down, maintenance, transport, etc. It should be noted that the draining system does not affect the electrolyser module during periods of operation, and can be considered as an independent part of the electrolyser module in this regard. The draining system comprises two separate draining systems, a cathode draining system for the cathode half cells, and an anode draining system for the anode half cells.

In the first embodiment, each of the cathode and anode draining systems comprise a plurality of connecting draining passages connecting the bottom portions of either each of the cathode half cell chambers or each of the anode half cell chambers to one or more draining manifolds. Note that by draining the half cell chambers, the corresponding degassing chambers also are drained, since they are connected to the half cell chambers by the degassed liquid passages and the gas-liquid passages. The cathode and anode draining systems can be, but are not necessarily, similar. The cathode draining system will be described here for illustrative purposes. The cathode draining passages comprise long passages with relatively small cross sectional areas connecting the bottom portion of the cathode half cell chambers with one or more cathode draining manifolds. The cathode draining manifolds are located below the cathode half cell chambers in order that draining can be achieved by gravity head, and extend at least part way along the length of the electrolyser module. The lengths of the draining passages for the cathode half cells can be extended by using paths comprised in more than one structural plate. In the current embodiment, the draining passages are internal passages near the bottom part of the cathode half cell chamber, which then become surface passages that follow a long downward path in order to render stray current flows during operation negligible. The passage then travels through one of the adjacent anode plates to the next cathode plate, where it once again becomes a surface passage with a long path, before joining one of the cathode draining manifolds. More than one cathode draining manifold can be used in order to further limit stray current flows. The one or more cathode draining manifolds connect to a draining point. The draining point comprises a draining port with a valve, located in the bottom portion of one of the intermediate pressure plates or one of the end pressure plates. There can be more than one draining point in the electrolyser module.

Figure 7:
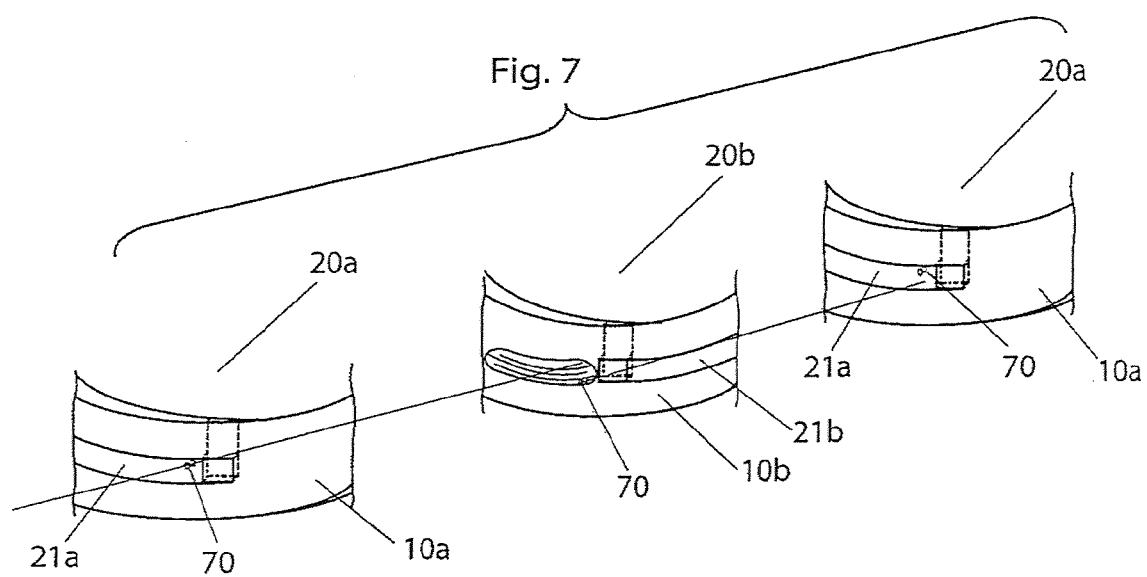
FIG. 7 shows an embodiment of a draining system for an electrolyser module in accordance with the present invention; and, FIG. 8 shows a schematic diagram of an electrolyser system in accordance with the present invention.

In the second embodiment, each of the cathode and anode draining systems also comprise draining channels for each half cell. Preferably, similar approaches are used for both the cathode and anode draining systems. The cathode draining system will be described here for illustrative purposes. The main features of the cathode draining system are shown in FIG. 7, which shows a series of three adjacent structural plates (two cathode structural plates and one anode structural plate) in the electrolyser module. The starting point of the cathode draining passage 70 for each cathode half cell is located in the degassed liquid passage 21*a*, near its point of connection to the cathode half cell chamber opening 20*a*. (In an alternative configuration (not shown), the cathode draining passage 70 is connected directly at or near the bottom of the cathode half cell chamber opening 20*a*.) Thus, the starting point of the cathode draining passage 70 lies underneath the cathode half cell chamber. The cathode draining passage 70 initially is an internal passage, passing through the thickness of the cathode structural plate 10*a* to the opposing face of adjacent anode structural plate 10*b*, where it becomes a surface passage that creates a long path in order to render stray current flows during operation negligible. The periphery of the area defined by the surface passages in the face of anode structural plate 10*b* is sealed, preferably by an o-ring (not shown) that is seated in a holding feature (not shown). The cathode draining passage 70 then once again becomes an internal passage, passing through the thickness of anode structural plate 10*b* to degassed liquid passage 21*a* in the adjacent cathode structural plate 10*a*. This multi-structural plate configuration is then repeated until a draining point is reached. The draining point comprises a draining port with internal channels connecting to a valve, located in the bottom portion of one of the intermediate pressure plates 12 or one of the end pressure plates 11. There can be more than one draining point in the electrolyser module. An advantage of the second embodiment is that there is no requirement for enlarging the bottom portions of the structural plates.

Figure 8:
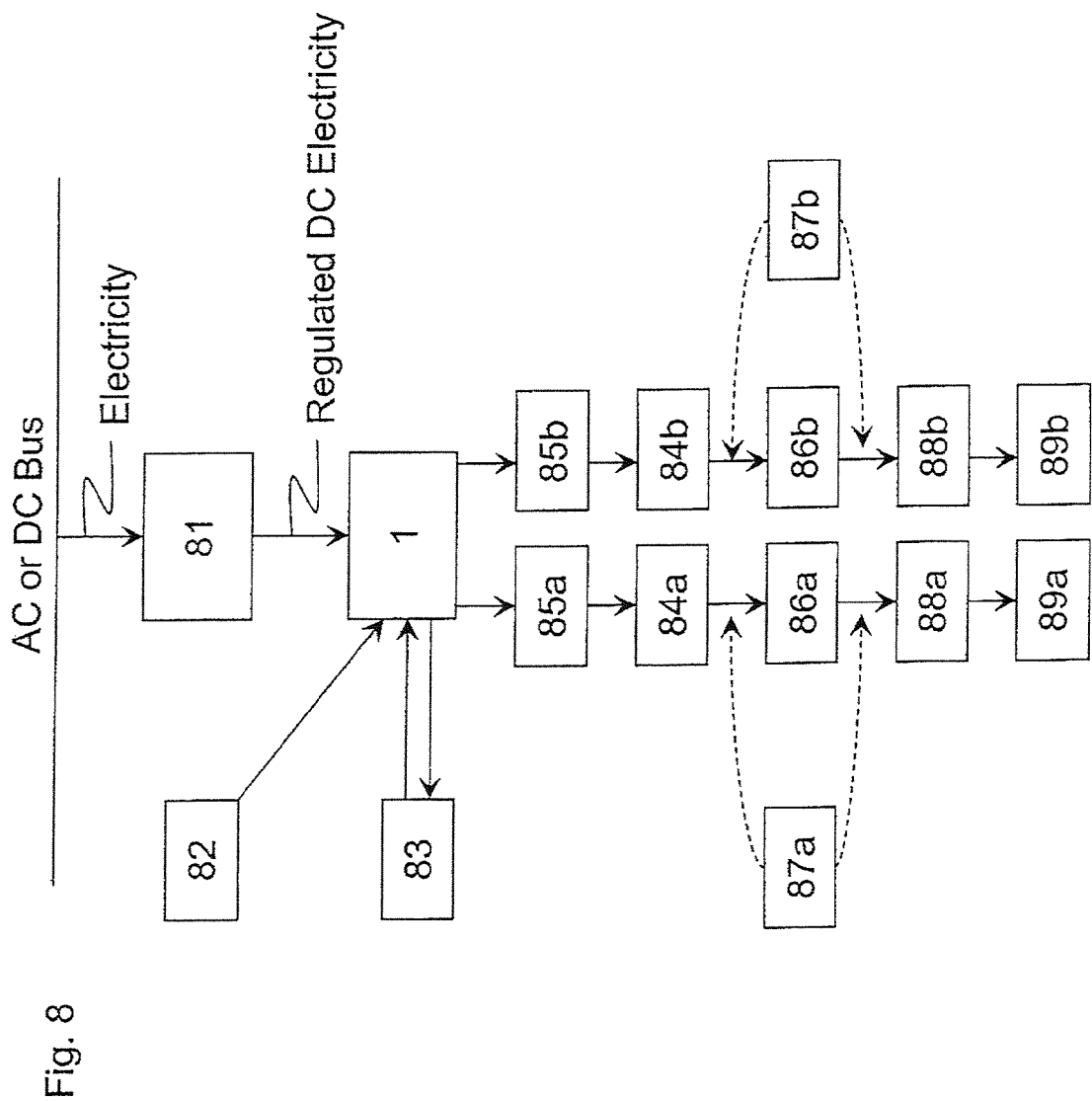

FIG. 8 shows a schematic diagram of an electrolyser system according to the current invention. The electrolyser module 1 is electrically connected to a source of electricity (electric power) according to any of the general electrical connection configurations described herein. The electricity supplied generally is DC electricity from a power supply 81, which can be, for example, a DC-DC converter to provide regulated DC electricity from a DC bus, or an AC-DC converter to provide regulated DC electricity from an AC bus; the primary electricity source can be an electricity grid, and/or other sources, such as a wind turbine or wind farm, or solar array or solar farm, optionally including some or all of equipment for intermediate processes such as electricity transmission, transformation, and "unregulated" rectification. The electrolyser module 1 is also connected to a feed water source 82, typically with intermediate feed water purification, e.g., by reverse osmosis and/or ion exchange units. The electrolyser module 1 is further connected to a coolant source 83, which may comprise a coolant reservoir with a chiller or other means of heat removal, as well as coolant circulation and flow rate control means.

The hydrogen gas outlet may be connected to a buffer volume 84*a* at the desired pressure for any downstream application or storage; a similar buffer volume 84*b* also can be used for the oxygen gas outlet. Such buffer volumes can be useful for enabling continuous flow of gases from the electrolyser module 1 at varying flow rates.

Optionally, demisting means 85*a* and 85*b*, as known in the art, can be used to remove mist from the hydrogen gas, and also preferably from the oxygen gas, respectively. Separate demisting means are used for the hydrogen gas stream and the oxygen gas stream. The demisting means can be located at any point between the respective gas outlets from electrolyser module 1 and buffer volumes 84*a* and 84*b*. Passages or conduits for return of collected liquid from the demisters to the corresponding hydrogen or oxygen degassing chamber also can be included. Further, the demisting means can be integrated into the degassing chambers. The exiting product hydrogen gas and/or oxygen gas can also be contacted with feed water to improve demisting efficiency and to facilitate return of removed electrolyte mist.

The electrolyser system may further comprise gas conditioning (gas purification) means for hydrogen 86*a*, and/or oxygen, 86*b*, which may comprise, e.g., catalytic purifiers and driers. Hydrogen compression means 87*a* and/or oxygen compression means 87*b* may be included according to downstream pressure requirements, and can be located either upstream or downstream of the gas conditioning means 86*a* and/or 86*b*, depending on the pressure of the gas produced by electrolyser module 1. Hydrogen transmission and/or storage means 88*a* and/or oxygen storage means 88*b* can optionally be included if there is a need to store excess hydrogen and/or oxygen for future use. Users 89*a* and 89*b* can be the same entity, and can include, for example, industrial processes using hydrogen and/or oxygen, hydrogen fuel dispensing systems for hydrogen-powered vehicles, or electricity generators.

In the case of alkaline water electrolysis, the inherently scalable electrolyser module generally produces hydrogen gas and oxygen gas by first generating the hydrogen gas and oxygen gas in the plurality of electrolytic cells contained in the electrolyser module. The hydrogen gas-electrolyte mixtures are transferred directly from the top part of each cathode half cell chamber to a bottom part of an upper section of one or more hydrogen degassing chambers that are integrally contained in the electrolyser module structure, through respective gas-liquid transfer passages extending directly from each cathode half cell chamber to the one or more hydrogen degassing chambers. The hydrogen gas-electrolyte mixture streams from each of the cathode half cells are directed longitudinally along the length of the one or more hydrogen degassing chambers, in order to promote heat transfer to the cooling conduits and to promote mixing of feed water additions. The hydrogen gas is separated from the liquid electrolyte in the one or more hydrogen degassing chambers to produce hydrogen gas and degassed electrolyte. The resulting hydrogen gas is removed from the top part of the one or more hydrogen degassing chambers, and the degassed electrolyte is transferred directly from the bottom part of the lower section of one or more hydrogen degassing chambers to the bottom part of the cathode half cell chamber through degassed liquid passages directly connecting the one or more hydrogen degassing chambers to each cathode half cell chamber.

Similarly, and simultaneously, the oxygen gas-electrolyte mixtures are transferred directly from the top part of each anode half cell chamber to the bottom part of the upper section of one or more oxygen degassing chambers that are integrally contained in the electrolyser module structure, through respective gas-liquid transfer passages extending directly from each anode half cell chamber to the one or more oxygen degassing chambers. The oxygen gas-electrolyte mixture streams from each of the anode half cells are directed longitudinally along the length of the one or more oxygen degassing chambers, in order to promote heat transfer to the cooling conduits and to promote mixing of any feed water additions. The oxygen gas is separated from the liquid electrolyte in the one or more oxygen degassing chambers to produce oxygen gas and degassed electrolyte. The resulting oxygen gas is removed from the top part of the one or more oxygen degassing chambers, and the degassed electrolyte is transferred directly from the bottom part of the lower section of the one or more oxygen degassing chambers to the bottom part of the anode half cell chamber through degassed liquid passages directly connecting the one or more oxygen degassing chambers to each anode half cell chamber. Note that the above process also is applicable for alkaline ammonia electrolysis, in which the inherently scalable electrolyser module produces hydrogen gas and nitrogen gas (instead of oxygen gas), and ammonium hydroxide is present in/added to the anolyte (anode side electrolyte). Of course, the oxygen degassing chamber would be a nitrogen degassing chamber in alkaline ammonia electrolysis.

The contemplated operating pressure of the electrolyser module according to the present invention lies between atmospheric pressure and 30 barg, depending on the application requirements and the pressure holding capability of the electrolyser module structure. In order to maintain inherent scalability of the electrolyser module, no additional pressure containment means, such as a pressure vessel surrounding the electrolyser module, or load bearing reinforcing support or shell/sleeve is utilized. Reinforcement of each structural plate can be considered to maintain inherent scalability of the electrolyser module.

It is preferable to start operation of the electrolyser module at the intended operating pressure, in order to avoid difficulties with larger gas volumes at lower pressures. Thus, the interior pressure of the electrolyser module is increased to the intended operating pressure prior to initial start up by introducing pressurized inert gas into the electrolyser module. The term initial start up is understood to include any start up after depressurization of the electrolyser module is required. Examples of suitable inert gases are nitrogen, argon and helium. Once the electrolyser module is pressurized with inert gas, operation of the electrolyser module can be started; the product gas is vented until the gas purity reaches acceptable levels, which will depend on the user application.

It also is preferable that liquid level during non-operational periods is lower than where the gas-liquid passage(s) and the degassed liquid passage(s) in each of the structural plates meets the degassing chamber, but is higher than the top of the half cell chamber. In this way, a break in the electrolyte path between half cell chambers is provided, while ensuring that the half cell chambers remain filled, and the membranes remain fully wetted.

EXAMPLE 1

The fluid flows in a six-cell electrolyser module according to the present invention were modeled by computational fluid dynamics (CFD). For simplicity, the fluid flows on the hydrogen (cathodes) side only are described herein. The general structural plate configuration was as shown in FIG. 3, in which the gas-liquid passage 21 extends from the top part of half cell chamber opening 20 and partway under corresponding degassing chamber opening 19a, then doubles back over itself before joining the bottom part of degassing chamber opening 19a at the near side. The cell active area was 6,000 cm$^2$. The hydrogen gas-liquid separation chamber was comprised of a main section 30 cm×50 cm×13.2 cm. The cross sectional area of the gas-liquid passages and the degassed liquid passages was 3 cm$^2$. The maximum current density was 1,000 mA/cm$^2$. This corresponds to a maximum hydrogen generation rate per half cell of 2.5 Nm$^3$/h, so the ratio of maximum hydrogen generation rate per half cell to the cross sectional area of each gas-liquid passage was 2.5/3=0.83 Nm$^3$/h/cm$^2$. Simulations for current densities from 100 mA/cm$^2$ to 1,000 mA/cm$^2$ showed: (a) good gas-liquid separation efficiency, with negligible gas carry under to the half cell chamber; (b) high liquid circulation rates; (c) low void fractions at the top of the cathode half cell chamber; and, (d) current efficiencies of 99%. The liquid circulation rates and void fractions for each of the six cathode half cells were within 2% of each other, which is indicative of inherent scalability.

EXAMPLE 2

Next, the number of cells in the electrolyser module of Example 1 was increased to 50 cells. The fluid flows in the 50-cell electrolyser module were modeled by CFD. For simplicity, the fluid flows on the hydrogen (cathodes) side only are described herein. The results for each half cell were similar to those obtained for half cells in the six-cell electrolyser module, demonstrating the inherent scalability of the design. For example, fluid flow rates in any of the degassed liquid passages in the 50-cell electrolyser module were within 6% of fluid flow rates in any of the degassed liquid passages in the six-cell electrolyser module. Furthermore: (i) fluid flow rates in degassed liquid passages were higher in the 50-cell electrolyser module than in the six-cell electrolyser module, and (ii) the fluid flow rates in the degassed liquid passages for each of the 50 cathode half cells were within 1% of each other. Similarly, void fractions at the tops of the 50 cathode half cell chambers were almost equal, and also were within 5% of the void fractions at the tops of any of the cathode half cell chambers in the six-cell electrolyser module.

EXAMPLE 3

Next, the number of cells in the electrolyser module of Example 2 was increased to 200 cells. The fluid flows in the 200-cell electrolyser module were modeled by CFD. For simplicity, the fluid flows on the hydrogen (cathodes) side only are described herein. The results for each half cell were similar to those obtained for half cells in six-cell and 50-cell electrolyser modules, demonstrating the inherent scalability of the design. For example, the range of fluid flow rates in the degassed liquid passages in the 200-cell electrolyser module was identical to the range of fluid flow rates in the degassed liquid passages in the 50-cell electrolyser module. Similarly, void fractions at the tops of the 200 cathode half cell chambers were almost equal, and also were almost equal to the void fractions at the tops of the cathode half cell chambers in the 50-cell electrolyser module.

The present electrolyser modules can be used in the production of various gases, for example chlorine and hydrogen by the electrolysis of brine, nitrogen and hydrogen by the electrolysis of ammonia, or oxygen and hydrogen in the case of electrolysis of water. The preferred embodiments of the invention described herein concern the electrolysis of water where the hydrogen-liquid and oxygen-liquid mixtures are generated in the respective half cell chambers.

It is contemplated that the electrolyser module of the present invention be used for large scale (e.g., MW scale), high pressure applications.

The foregoing description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

The invention claimed is:

1. An electrolyser module comprising a plurality of structural plates each having a sidewall extending between opposite end faces with a half cell chamber opening and at least two degassing chamber openings extending through said structural plate between said opposite end faces;
    said structural plates being arranged in face to face juxtaposition between opposite end pressure plates;
    each said half cell chamber opening at least partially housing electrolytic half cell components comprising at least an electrode, a bipolar plate in electrical communication with said electrode and a membrane, said structural plates and half cell components defining an array of series connected electrolytic cells surmounted by at least first and second degassing chambers each having an upper section above a lower section;
    said structural plates defining at least when in said face to face juxtaposition, respective gas-liquid passages extending between a top part of the half cell chambers and a bottom part of said upper section of said first and second degassing chambers to provide fluid communication between an anode part of said electrolytic cells and said first degassing chamber and between a cathode part of said electrolytic cells and said second degassing chamber;
    said structural plates further defining, at least when in said face to face juxtaposition, respective discrete degassed liquid passages extending between a bottom part of said lower section of said first and second degassing chambers and a bottom part of said half cell chambers for degassed liquid return from said first and second degassing chambers respectively to said anode and cathode parts of said electrolytic cells;
    said electrolyser module further comprising respective gas discharge and feed water passages extending therethrough and fluidly communicating with said degassing chambers for gas discharge from said degassing chambers and for feed water introduction into said degassing chambers; and
    said electrolyser module also comprising at least one cooling conduit contained in at least one of said first and second degassing chambers.

2. An electrolyser module as claimed in claim 1 further comprising at least one intermediate pressure plate interspersed between said structural plates along said length of said electrolyser module; each said at least one intermediate pressure plate comprising opposite end faces with a sidewall extending therebetween, said intermediate pressure plate defining at least one of first and second degassing chamber openings and through holes extending between its opposite end faces for fluidly communicating respectively with said first and second degassing chambers for receiving gas therefrom.

3. An electrolyser module of claim 2 wherein at least one of said at least two degassing chamber openings in at least one of said structural plates, at least one special structural plate, and said at least one intermediate pressure plate, includes a stray current blocking wall.

4. An electrolyser module of claim 2 wherein said bodies of said end plates and said at least one intermediate pressure plate are comprised of at least one of steel, stainless steel, nickel-plated steel, nickel-plated stainless steel, nickel and nickel alloy.

5. An electrolyser module as claimed in claim 4, wherein said at least one intermediate pressure plate further comprises at least one of protective plastic inserts and protective fibre reinforced plastic inserts, fitted into said at least first and second degassing chamber openings.

6. An electrolyser module as claimed in claim 5, wherein said at least one of protective plastic inserts and protective fiber reinforced inserts further comprises a stray current blocking wall.

7. An electrolyser module as claimed in claim 4, wherein at least one of said end pressure plates and said at least one intermediate pressure plate further comprises at least one of nickel sheets, nickel plated sheets, nickel plates and nickel plated plates inserted into at least one of holding features in special structural plates adjacent to at least one of said end pressure plates and said at least one intermediate pressure plate and recesses in at least one of said end pressure plates and in both opposite end faces of said at least one intermediate pressure plate, wherein said nickel sheets, nickel plated sheets, nickel plates and nickel plated plates are thereby located so as to face and correspond to the adjacent half cell chambers.

8. An electrolyser module as claimed in claim 4 further comprising special structural plates adjacent to at least one of said end pressure plates and said at least one intermediate pressure plate, wherein said end structural plates hold bipolar plates, and further wherein current carriers are used to provide electrical connection between said bipolar plates and said at least one of said end pressure plates and said at least one intermediate pressure plate.

9. An electrolyser module of claim 2 wherein said at least one intermediate pressure plate is located so as to divide said plurality of electrolysis cells into sections of equal numbers of cells.

10. An electrolyser module as claimed in claim 9, wherein each of said at least first and second degassing chambers further comprises at least one gas discharge outlet located in at least one of said at least one intermediate pressure plate and at least one of said end pressure plates.

11. An electrolyser module as claimed in claim 2, wherein said at least one cooling conduit is connected to at least one external coolant circulation loop through at least one of said at least one intermediate pressure plates and at least one of said end pressure plates.

12. An electrolyser module of claim 2 further comprising electrical power connections to pass current through said plurality of electrolytic cells, wherein positive electrical power connection is made to one of said end pressure plates, and negative electrical power connection is made to the other of said end pressure plates.

13. An electrolyser module of claim 2 further comprising electrical power connections to pass current through said plurality of electrolytic cells, wherein positive electrical power connection is made to both of said end pressure plates.

14. An electrolyser module of claim 13 wherein said at least one intermediate pressure plate comprises an odd number of intermediate pressure plates and further wherein said intermediate pressure plates divide said electrolyser module into sections of equal numbers of cells, said electrolyser module further comprising alternating negative and positive electrical power connections to said intermediate pressure plates, wherein said negative and positive electrical power connections to said intermediate pressure plates are located such that negative and positive electrical power connections alternate over the length of said electrolyser module.

15. An electrolyser module of claim 2 further comprising electrical power connections to pass current through said plurality of electrolytic cells, wherein negative electrical power connection is made to both of said end pressure plates.

16. An electrolyser module as claimed in claim 2 further comprising at least one of external piping and passages in the body of at least one of said end pressure plates and said at least one intermediate pressure plate to connect said lower section of said first and second degassing chambers.

17. The electrolyser module of claim 1 wherein at least a portion of said gas-liquid and degassed liquid passages are partially defined by channels extending into at least one of said opposite end faces of said structural plates.

18. The electrolyser module of claim 17 wherein said passages are defined by surface channels extending into at least some of said opposite end faces of said structural members in conjunction with the adjacent of said opposite end faces of said structural plates.

19. An electrolyser module of claim 1 wherein said gas-liquid passages extend underneath and substantially across the width of at least of one of said at least two degassing chamber openings before connecting to said at least one of said at least two degassing chamber openings.

20. An electrolyser module of claim 1 wherein said gas-liquid passages extend underneath and partway across the width of at least one of said at least two degassing chamber openings before doubling back over itself and connecting to said at least one of said at least two degassing chamber openings.

21. An electrolyser module of claim 1 wherein said gas-liquid passages extend over the top of at least one of said at least two degassing chamber openings before connecting to said at least one of said at least two degassing chamber openings.

22. An electrolyser module of claim 1 wherein said gas-liquid passages extend substantially vertically upward from said half cell chamber opening, and then returns substantially vertically downward before connecting to at least one of said at least two degassing chamber openings.

23. An electrolyser module of claim 1 wherein at least one of said at least two degassing chamber openings further comprises a fluid flow directing means where said gas-liquid passages enter said degassing chamber.

24. An electrolyser module as claimed in claim 23 wherein said fluid flow directing means comprises a fluid flow directing hood.

25. An electrolyser module as claimed in claim 24 wherein said fluid flow directing hood comprises a roof and at least one and as many as three walls.

26. An electrolyser module of claim 1 further comprising holding features in said body around the periphery of said half cell chamber opening for locating and holding said electrolytic half cell components.

27. An electrolyser module of claim 1 further comprising holding features in at least said structural plates for locating and holding sealing gaskets.

28. An electrolyser module as claimed in claim 27, wherein said holding features include a holding feature for locating and holding at least one sealing gasket so as to completely surround all of said at least two degassing chamber openings, said half cell chamber opening, said gas-liquid passages, and said degassed liquid passages.

29. An electrolyser module of claim 27, wherein said holding features further include a holding feature for locating and holding at least one sealing gasket so as to completely enclose at least one of said at least two degassing chamber openings.

30. An electrolyser module of claim 1 wherein said sidewall of said structural plates have a peripheral shape without sharp corners.

31. An electrolyser module of claim 1 wherein at least one of said at least two degassing chamber openings has an irregular shape with rounded corners.

32. An electrolyser module of claim 1 wherein at least one of said at least two degassing chamber openings has a rounded shape.

33. An electrolyser module of claim 1 wherein at least one of said at least two degassing chamber openings has a rectilinear shape with rounded corners.

34. An electrolyser module of claim 1 wherein said structural plates are comprised of plastic.

35. An electrolyser module as of claim 34 wherein said plastic is comprised of at least one of polysulfone, polyphenylene oxide, polyphenylene sulphide, polypropylene, and polyoxymethylene.

36. An electrolyser module of claim 1 wherein said structural plates are comprised of fibre reinforced plastic.

37. An electrolyser module of claim 1 further comprising means for adding feed water to at least one of said at least first and second degassing chambers.

38. An electrolyser module as claimed in claim 1 further comprising electrical power connections to pass current through said plurality of electrolytic cells, wherein positive electrical power connection is made to one of said end pressure plates, and negative electrical power connection is made to the other of said end pressure plates.

39. An electrolyser module of claim 38 further comprising at least one non-current carrying electrical ground connection to said at least one intermediate pressure plate.

40. An electrolyser module of claim 38 wherein said at least one intermediate pressure plate comprises an even number of intermediate pressure plates and further wherein said intermediate pressure plates divide said electrolyser module into sections of equal numbers of cells, said electrolyser module further comprising alternating negative and positive electrical power connections to said intermediate pressure plates, wherein said negative and positive electrical power connections to said intermediate pressure plates are located such that negative and positive electrical power connections alternate over the length of said electrolyser module.

41. An electrolyser module of claim 38 wherein said negative electrical power connections are connected to the same electrical ground.

42. An electrolyser module of claim 1 further comprising a cathode draining system wherein said cathode draining system comprises cathode draining passages connected to at least one of the degassed liquid passages and the cathode half cell chamber openings, and further wherein said cathode draining passages comprise sections in which said cathode draining passages are surface channels, and sections in which said cathode draining passages are internal passages.

43. An electrolyser module as claimed in claim 42 wherein said cathode draining passages extend through at least two adjacent structural plates.

44. An electrolyser module of claim 1 further comprising an anode draining system wherein said anode draining system comprises anode draining passages connected to at least one of the passages for degassed liquid transfer and the anode half cell chamber openings, and further wherein said anode draining passages comprise sections in which said anode draining passages are surface passages, and sections in which said anode draining passages are internal passages.

45. An electrolyser module as claimed in claim 44 wherein said anode draining passages extend through at least two adjacent structural plates.

46. A method of operating an electrolyser module of claim 1 comprising the step of increasing the interior pressure of said electrolyser module to an intended operating pressure prior to initial start up by introducing inert gas into said electrolyser module.

47. The method of claim 46 wherein said inert gas comprises at least one of nitrogen, argon and helium.

48. The method of any of claim 46 wherein said intended operating pressure lies between atmospheric pressure and 30 barg.

49. A method of operating an electrolyser module of claim 1 comprising the step of maintaining a liquid level during non-operational periods which is lower than where said at least one gas-liquid passage and said at least one degassed liquid passage in each of said structural plates meets said degassing chamber, but which is higher than the top of said half cell chamber.

50. A method of producing hydrogen gas and oxygen gas using an electrolyser module comprising the steps of:
 (a) generating hydrogen gas and oxygen gas by alkaline electrolysis of water in a plurality of electrolytic cells contained in said electrolyser module each said electrolytic cell comprising a cathode half cell wherein said hydrogen gas is generated and an anode half cell wherein said oxygen gas is generated;
 (b) transferring a mixture of said hydrogen gas and liquid electrolyte directly from the top part of each cathode half cell chamber to a bottom part of an upper section of at least one hydrogen degassing chamber integrally contained in said electrolyser module structure through respective gas-liquid passages extending directly from said each cathode half cell chamber to said at least one hydrogen degassing chamber;
 (c) cooling said mixture of said hydrogen gas and liquid electrolyte in said at least one hydrogen degassing chamber, said at least one hydrogen degassing chamber containing at least one cooling conduit;
 (d) separating said hydrogen gas from said liquid electrolyte in said at least one hydrogen degassing chamber to produce gas and degassed electrolyte;
 (e) removing said hydrogen gas from the top part of said at least one hydrogen degassing chamber;
 (f) transferring said degassed electrolyte directly from a bottom part of a lower section of said at least one hydrogen degassing chamber to the bottom part of each of said cathode half cell chambers through respective discrete degassed liquid passages extending directly from said at least one hydrogen degassing chamber to said each cathode half cell chamber;
 (g) transferring a mixture of said oxygen gas and liquid electrolyte directly from a top part of each anode half cell chamber to a bottom part of an upper section of at least one oxygen degassing chamber contained in said electrolyser module structure through respective gas-liquid passages extending directly from said each anode half cell chamber to said at least one oxygen degassing chamber;
 (h) cooling said mixture of said oxygen gas and liquid electrolyte in said at least one oxygen degassing chamber;
 (i) separating said oxygen gas from said liquid electrolyte in said at least one oxygen degassing chamber to produce oxygen gas and degassed electrolyte;
 (j) removing said oxygen gas from the top part of said at least one oxygen degassing chamber;
 (k) transferring said degassed electrolyte directly from a bottom part of a lower section of said at least one oxygen degassing chamber to the bottom part of each of said anode half cell chambers through respective discrete degassed liquid passages extending directly from said at least one oxygen degassing chamber to said each anode half cell chamber.

51. A method of operating an electrolyser module as claimed in claim 50, further comprising at least one of the steps of: directing said mixture of said hydrogen gas and liquid electrolyte transferred from each cathode half cell chamber longitudinally along the length of said hydrogen degassing chamber; and, directing said mixture of said oxygen gas and liquid electrolyte transferred from each anode half cell chamber longitudinally along the length of said oxygen degassing chamber.

52. A method of producing hydrogen gas and nitrogen gas using an electrolyser module comprising the steps of:
 (a) generating hydrogen gas and nitrogen gas by alkaline electrolysis of ammonia in a plurality of electrolytic cells contained in said electrolyser module, each said electrolytic cell comprising a cathode half cell wherein said hydrogen gas is generated and an anode half cell wherein said nitrogen gas is generated;
 (b) transferring a mixture of said hydrogen gas and liquid electrolyte directly from the top part of each cathode half cell chamber to a bottom part of an upper section of at least one hydrogen degassing chamber integrally contained in said electrolyser module structure through respective gas-liquid passages extending directly from said each cathode half cell chamber to said at least one hydrogen degassing chamber;
 (c) cooling said mixture of said hydrogen gas and liquid electrolyte in said at least one hydrogen degassing chamber;
 (d) separating said hydrogen gas from said liquid electrolyte in said at least one hydrogen degassing chamber to produce hydrogen gas and degassed electrolyte;
 (e) removing said hydrogen gas from the top part of said at least one hydrogen degassing chamber;
 (f) transferring said degassed electrolyte directly from a bottom part of a lower section of said at least one hydrogen degassing chamber to the bottom part of each of said cathode half cell chambers through respective discrete degassed liquid passages extending directly from said at least one hydrogen degassing chamber to said each cathode half cell chamber;

(g) transferring a mixture of said nitrogen gas and liquid electrolyte directly from the top part of each anode half cell chamber to a bottom part of an upper section of at least one nitrogen degassing chamber contained in said electrolyser module structure through respective gas-liquid passages extending directly from said each anode half cell chamber to said at least one nitrogen degassing chamber;

(h) cooling said mixture of said nitrogen gas and liquid electrolyte in said at least one nitrogen degassing chamber;

(i) separating said nitrogen gas from said liquid electrolyte in said at least one nitrogen degassing chamber to produce nitrogen gas and degassed electrolyte;

(j) removing said nitrogen gas from said liquid electrolyte in said at least one nitrogen degassing chamber to produce nitrogen gas and degassing electrolyte;

(k) transferring said degassed electrolyte directly from a bottom part of a lower section of said at least one nitrogen degassing chamber to the bottom part of each of said anode half cell chambers through respective discrete degassed liquid passages extending directly from said at least one nitrogen degassing chamber to said each anode half cell chamber.

53. A method of operating an electrolyser module as claimed in claim 52, further comprising at least one of the steps of: directing said mixture of said hydrogen gas and liquid electrolyte transferred from each cathode half cell chamber longitudinally along the length of said hydrogen degassing chamber; and, directing said mixture of said nitrogen gas and liquid electrolyte transferred from each anode half cell chamber longitudinally along the length of said nitrogen degassing chamber.

54. An electrolyser module comprising a plurality of structural plates each having a sidewall extending between opposite end faces with a half cell chamber opening and at least two degassing chamber openings extending through said structural plate between said opposite end faces;
said structural plates being arranged in face to face juxtaposition between opposite end pressure plates;
each said half cell chamber opening at least partially housing electrolytic half cell components comprising at least an electrode, a bipolar plate in electrical communication with said electrode and a membrane, said structural plates and half cell components defining an array of series connected electrolytic cells surmounted by at least first and second degassing chambers each having an upper section above a lower section;
said structural plates defining at least when in said face to face juxtaposition, respective gas-liquid passages extending underneath and partway across the width of at least one of said at least two degassing chamber openings before doubling back over itself and connecting to at least one of said at least two degassing chamber openings to provide fluid communication between an anode part of said electrolytic cells and said first degassing chamber and between a cathode part of said electrolytic cells and said second degassing chamber;
said structural plates further defining, at least when in said face to face juxtaposition, respective discrete degassed liquid passages extending between a bottom part of said lower section of said first and second degassing chambers and a bottom part of said half cell chambers for degassed liquid return from said first and second degassing chambers respectively to said anode and cathode parts of said electrolytic cells; and
said electrolyser module further comprising respective gas discharge and feed water passages extending therethrough and fluidly communicating with said degassing chambers for gas discharge from said degassing chambers and for feed water introduction into said degassing chambers.

55. An electrolyser module as claimed in claim 54 further comprising at least one intermediate pressure plate interspersed between said structural plates along said length of said electrolyser module; each said at least one intermediate pressure plate comprising opposite end faces with a sidewall extending therebetween, said intermediate pressure plate defining at least first and second degasser openings extending between its opposite end faces for fluidly communicating respectively with said first and second degassing chambers for receiving gas therefrom.

56. An electrolyser module of claim 55 wherein at least one of said at least two degassing chamber openings in at least one of said structural plates, at least one special structural plate, and said at least one intermediate pressure plate, includes a stray current blocking wall.

57. An electrolyser module of claim 55 wherein said bodies of said end plates and said at least one intermediate pressure plate are comprised of at least one of steel, stainless steel, nickel-plated steel, nickel-plated stainless steel, nickel and nickel alloy.

58. An electrolyser module as claimed in claim 57, wherein said at least one intermediate pressure plate further comprises at least one of protective plastic inserts and protective fibre reinforced plastic inserts, fitted into said at least first and second degassing chamber openings.

59. An electrolyser module as claimed in claim 57, wherein at least one of said end pressure plates and said at least one intermediate pressure plate further comprises at least one of nickel sheets, nickel plated sheets, nickel plates and nickel plated plates inserted into at least one of holding features in special structural plates adjacent to at least one of said end pressure plates and said at least one intermediate pressure plate and recesses in at least one of said end pressure plates and in both opposite end faces of said at least one intermediate pressure plate, wherein said nickel sheets, nickel plated sheets, nickel plates and nickel plated plates are thereby located so as to face and correspond to the adjacent half cell chambers.

60. An electrolyser module as claimed in claim 57 further comprising special structural plates adjacent to at least one of said end pressure plates and said at least one intermediate pressure plate, wherein said end structural plates hold bipolar plates, and further wherein current carriers are used to provide electrical connection between said bipolar plates and said at least one of said end pressure plates and said at least one intermediate pressure plate.

61. An electrolyser module as claimed in claim 57, wherein said at least one of protective plastic inserts and protective fibre reinforced inserts further comprises a stray current blocking wall.

62. An electrolyser module of claim 55 wherein said at least one intermediate pressure plate is located so as to divide said plurality of electrolysis cells into sections of equal numbers of cells.

63. An electrolyser module as claimed in claim 62, wherein each of said at least first and second degassing chambers further comprises at least one gas discharge outlet located in at least one of said at least one intermediate pressure plate and at least one of said end pressure plates.

64. An electrolyser module of claim 55 further comprising electrical power connections to pass current through said plurality of electrolytic cells, wherein positive electrical power connection is made to one of said end pressure plates, and negative electrical power connection is made to the other of said end pressure plates.

65. An electrolyser module as claimed in claim 54 further comprising electrical power connections to pass current through said plurality of electrolytic cells, wherein positive electrical power connection is made to one of said end pressure plates, and negative electrical power connection is made to the other of said end pressure plates.

66. An electrolyser module of claim 55 further comprising electrical power connections to pass current through said plurality of electrolytic cells, wherein positive electrical power connection is made to both of said end pressure plates.

67. An electrolyser module of claim 66 wherein said at least one intermediate pressure plate comprises an odd number of intermediate pressure plates and further wherein said intermediate pressure plates divide said electrolyser module into sections of equal numbers of cells, said electrolyser module further comprising alternating negative and positive electrical power connections to said intermediate pressure plates, wherein said negative and positive electrical power connections to said intermediate pressure plates are located such that negative and positive electrical power connections alternate over the length of said electrolyser module.

68. An electrolyser module of claim 55 further comprising electrical power connections to pass current through said plurality of electrolytic cells, wherein negative electrical power connection is made to both of said end pressure plates.

69. The electrolyser module of claim 54 wherein at least a portion of said gas-liquid and degassed liquid passages are partially defined by channels extending into at least one of said opposite end faces of said structural plates.

70. The electrolyser module of claim 69 wherein said passages are defined by surface channels extending into at least some of said opposite end faces of said structural members in conjunction with the adjacent of said opposite end faces of said structural plates.

71. An electrolyser module of claim 54 wherein at least one of said at least two degassing chamber openings further comprises a fluid flow directing means where said gas-liquid passages enter said degassing chamber.

72. An electrolyser module as claimed in claim 71 wherein said fluid flow directing means comprises a fluid flow directing hood.

73. An electrolyser module as claimed in claim 72 wherein said fluid flow directing hood comprises a roof and at least one and as many as three walls.

74. An electrolyser module of claim 54 further comprising holding features in said body around the periphery of said half cell chamber opening for locating and holding said electrolytic half cell components.

75. An electrolyser module of claim 54 further comprising holding features in at least said structural plates for locating and holding sealing gaskets.

76. An electrolyser module as claimed in claim 75, wherein said holding features include a holding feature for locating and holding at least one sealing gasket so as to completely surround all of said at least two degassing chamber openings, said half cell chamber opening, said gas-liquid passages, and said degassed liquid passages.

77. An electrolyser module of claim 75, wherein said holding features further include a holding feature for locating and holding at least one sealing gasket so as to completely enclose at least one of said at least two degassing chamber openings.

78. An electrolyser module of claim 54 wherein said sidewall of said structural plates have a peripheral shape without sharp corners.

79. An electrolyser module of claim 54 wherein at least one of said at least two degassing chamber openings has an irregular shape with rounded corners.

80. An electrolyser module of claim 54 wherein at least one of said at least two degassing chamber openings has a rounded shape.

81. An electrolyser module of claim 54 wherein at least one of said at least two degassing chamber openings has a rectilinear shape with rounded corners.

82. An electrolyser module of claim 54 wherein said structural plates are comprised of plastic.

83. An electrolyser module as of claim 82 wherein said plastic is comprised of at least one of polysulfone, polyphenylene oxide, polyphenylene sulphide, polypropylene, and polyoxymethylene.

84. An electrolyser module of claim 54 wherein said structural plates are comprised of fibre reinforced plastic.

85. An electrolyser module as claimed in claim 54, wherein at least one of said at least first and second degassing chambers contains at least one set of cooing coils and wherein said at least one set of cooling coils is connected to at least one external coolant circulation loop through at least one of said at least one intermediate pressure plates and at least one of said end pressure plates.

86. An electrolyser module of claim 54 further comprising means of adding feed water to at least one of said at least first and second degassing chambers.

87. An electrolyser module of claim 65 further comprising at least one non-current carrying electrical ground connection to said at least one intermediate pressure plate.

88. An electrolyser module of claim 65 wherein said at least one intermediate pressure plate comprises an even number of intermediate pressure plates and further wherein said intermediate pressure plates divide said electrolyser module into sections of equal numbers of cells, said electrolyser module further comprising alternating negative and positive electrical power connections to said intermediate pressure plates, wherein said negative and positive electrical power connections to said intermediate pressure plates are located such that negative and positive electrical power connections alternate over the length of said electrolyser module.

89. An electrolyser module of claim 65 wherein said negative electrical power connections are connected to the same electrical ground.

90. An electrolyser module of claim 54 further comprising a cathode draining system wherein said cathode draining system comprises cathode draining passages connected to at least one of the degassed liquid passages and the cathode half cell chamber openings, and further wherein said cathode draining passages comprise sections in which said cathode draining passages are surface channels, and sections in which said cathode draining passages are internal passages.

91. An electrolyser module as claimed in claim 90 wherein said cathode draining passages extend through at least two adjacent structural plates.

92. An electrolyser module of claim 54 further comprising an anode draining system wherein said anode draining system comprises anode draining passages connected to at least one of the passages for degassed liquid transfer and the anode half cell chamber openings, and further wherein said anode draining passages comprise sections in which said anode draining passages are surface passages, and sections in which said anode draining passages are internal passages.

93. An electrolyser module as claimed in claim 92 wherein said anode draining passages extend through at least two adjacent structural plates.

* * * * *